US008151436B2

(12) United States Patent
Ohnuma et al.

(10) Patent No.: US 8,151,436 B2
(45) Date of Patent: Apr. 10, 2012

(54) METHOD OF FORMING MEMBER, VALVE GUIDE AND METHOD OF FORMING THE SAME, AND METHOD OF FORMING TUBULAR MEMBER

(75) Inventors: Takayuki Ohnuma, Sayama (JP); Takashi Kobayashi, Sayama (JP); Tsutomu Ando, Sayama (JP); Hidetaka Hiruma, Sayama (JP); Ryotaro Takada, Sayama (JP)

(73) Assignee: Honda Motor Co., Ltd., Tokyo (JP)

( * ) Notice: Subject to any disclaimer, the term of this patent is extended or adjusted under 35 U.S.C. 154(b) by 1335 days.

(21) Appl. No.: 10/583,939

(22) PCT Filed: Oct. 21, 2004

(86) PCT No.: PCT/JP2004/015623
§ 371 (c)(1),
(2), (4) Date: Jun. 7, 2007

(87) PCT Pub. No.: WO2005/061151
PCT Pub. Date: Jul. 7, 2005

(65) Prior Publication Data

US 2008/0034573 A1 Feb. 14, 2008

(30) Foreign Application Priority Data

| | | |
|---|---|---|
| Dec. 22, 2003 | (JP) | 2003-424945 |
| Feb. 24, 2004 | (JP) | 2004-047664 |
| Feb. 25, 2004 | (JP) | 2004-050240 |
| Feb. 25, 2004 | (JP) | 2004-050270 |
| Feb. 25, 2004 | (JP) | 2004-050293 |
| Aug. 18, 2004 | (JP) | 2004-237872 |

(51) Int. Cl.
*B23P 13/04* (2006.01)
*B05B 1/30* (2006.01)

(52) U.S. Cl. ........... 29/558; 29/888.41; 29/557; 72/402; 239/584; 239/533.2

(58) Field of Classification Search ............... 29/888.41, 29/888.4, 890.09, 890.1, 557, 558; 72/402, 72/401, 370.04; 239/584, 585.5, 533.2, 124
See application file for complete search history.

(56) References Cited

U.S. PATENT DOCUMENTS 4,435,972 A * 3/1984 Simon ............................ 72/256
(Continued)

FOREIGN PATENT DOCUMENTS

DE 198 44 346 A1 4/1999
(Continued)

*Primary Examiner* — Essama Omgba
(74) *Attorney, Agent, or Firm* — Katz, Quintos & Hanson, LLP

(57) ABSTRACT

There is provided a method by which a member having an undercut in the inner peripheral portion thereof can be formed readily. To form a material (1) formed with a recess (2) and the undercut (3) by using a swaging device, while the material (1) is first gripped by a clamper (11), and a mandrel (12) is inserted into the recess (2) of the material (1). The mandrel (12) used has an outside diameter equal to the inside diameter of a blind hole of an aimed product (fuel injection nozzle). Then, the material (1) is pushed in by the mandrel (12) to a position at which the material (1) abuts on a stopper (13), and the outside surface of the material (1) is struck by swaging dies (8) to perform a swaging operation. This swaging operation reduces the inside diameter of the recess (2) to the outside diameter of the mandrel (12), with the undercut (3) left.

12 Claims, 23 Drawing Sheets

U.S. PATENT DOCUMENTS

| | | | | | |
|---|---|---|---|---|---|
| 5,337,476 | A * | 8/1994 | Orsini, Jr. | 29/888.1 |
| 5,522,246 | A * | 6/1996 | Simon | 72/260 |
| 6,039,237 | A | 3/2000 | Nakajima et al. | |
| 6,053,425 | A * | 4/2000 | Stringfellow | 239/124 |
| 6,758,077 | B2 * | 7/2004 | Kaneko | 72/85 |
| 6,840,283 | B2 * | 1/2005 | Furugen et al. | 138/109 |
| 7,007,869 | B2 * | 3/2006 | Lewentz et al. | 239/533.2 |
| 7,213,576 | B2 * | 5/2007 | Furugen | 123/468 |
| 7,644,601 | B2 * | 1/2010 | Brochheuser et al. | 72/283 |
| 2004/0021012 | A1 * | 2/2004 | Lewentz et al. | 239/533.11 |
| 2006/0042710 | A1 * | 3/2006 | Furugen | 138/109 |
| 2006/0102753 | A1 * | 5/2006 | Tanaka | 239/533.2 |
| 2008/0314113 | A1 * | 12/2008 | Minoguchi | 72/370.06 |

FOREIGN PATENT DOCUMENTS

| | | | |
|---|---|---|---|
| JP | 46-1254 | | 9/1971 |
| JP | 56-59552 | | 5/1981 |
| JP | 56-97716 | | 8/1981 |
| JP | 58-9739 | | 1/1983 |
| JP | 58-181910 | | 12/1983 |
| JP | 60-68130 | | 4/1985 |
| JP | 61-197707 | | 9/1986 |
| JP | 3/207545 | | 9/1991 |
| JP | 4-167944 | | 6/1992 |
| JP | 6-145921 | | 5/1994 |
| JP | 6-190491 | | 7/1994 |
| JP | 7-265994 | | 10/1995 |
| JP | 8-90140 | | 4/1996 |
| JP | 10-296378 | | 11/1998 |
| JP | 11-104822 | | 4/1999 |
| JP | 11-350059 | | 12/1999 |
| JP | 2000-8132 | | 1/2000 |
| WO | WO 94/01658 | A1 | 1/1994 |
| WO | WO 96/03236 | A1 | 2/1996 |

* cited by examiner

【FIG. 1】
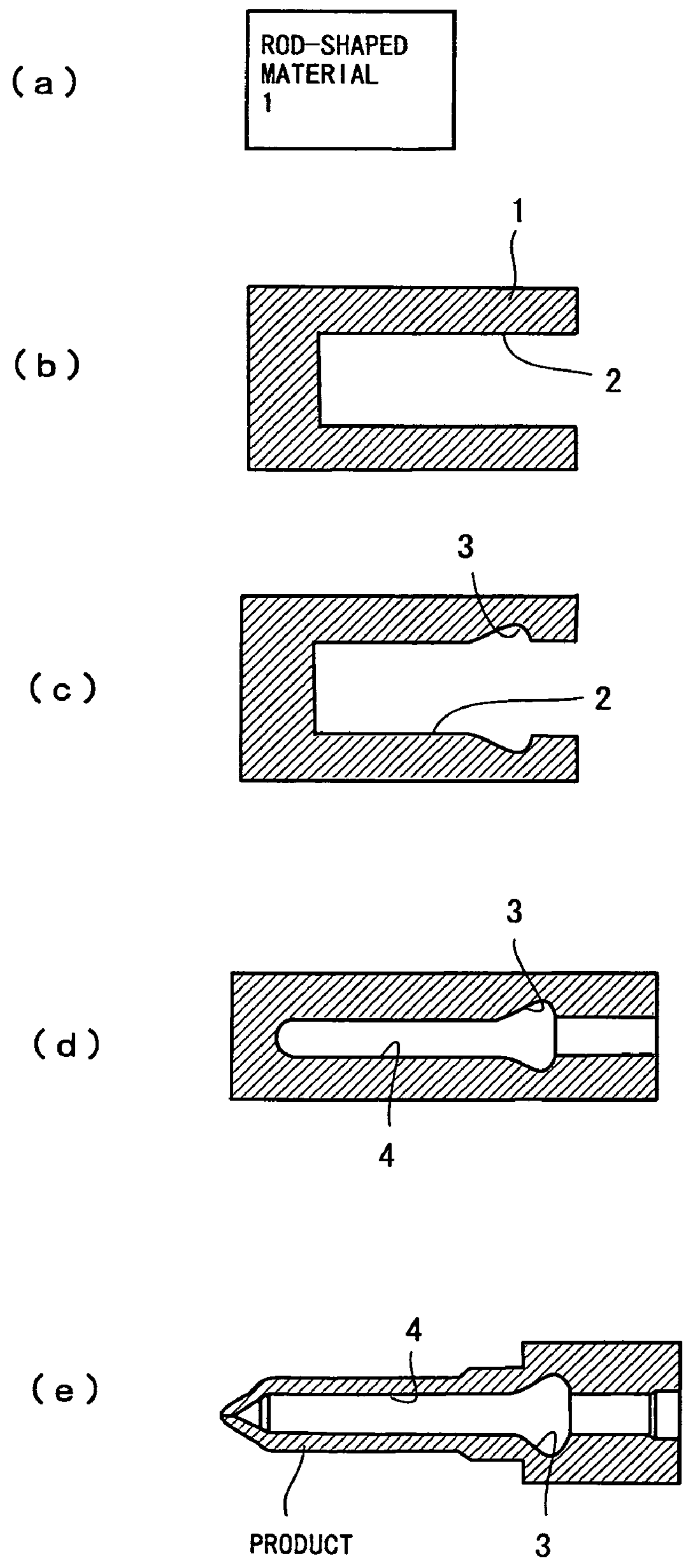

【FIG. 2】
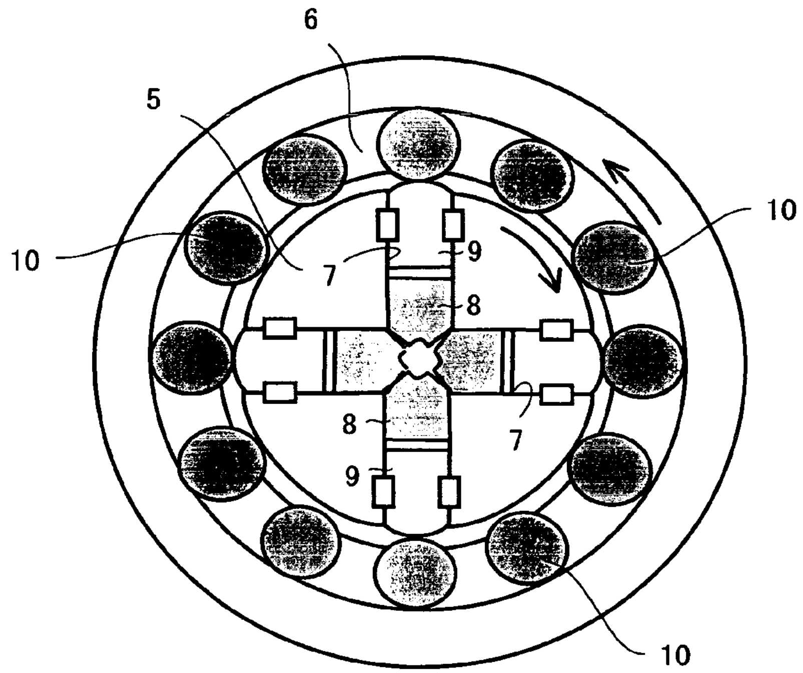
【FIG. 3】
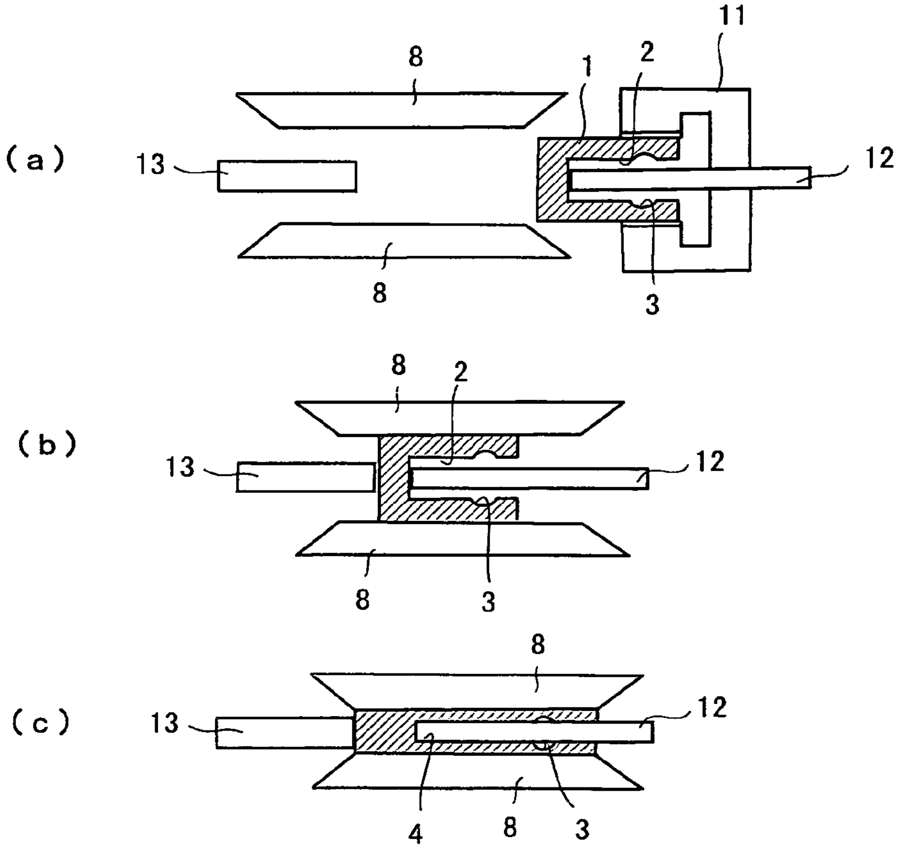

【FIG. 4】
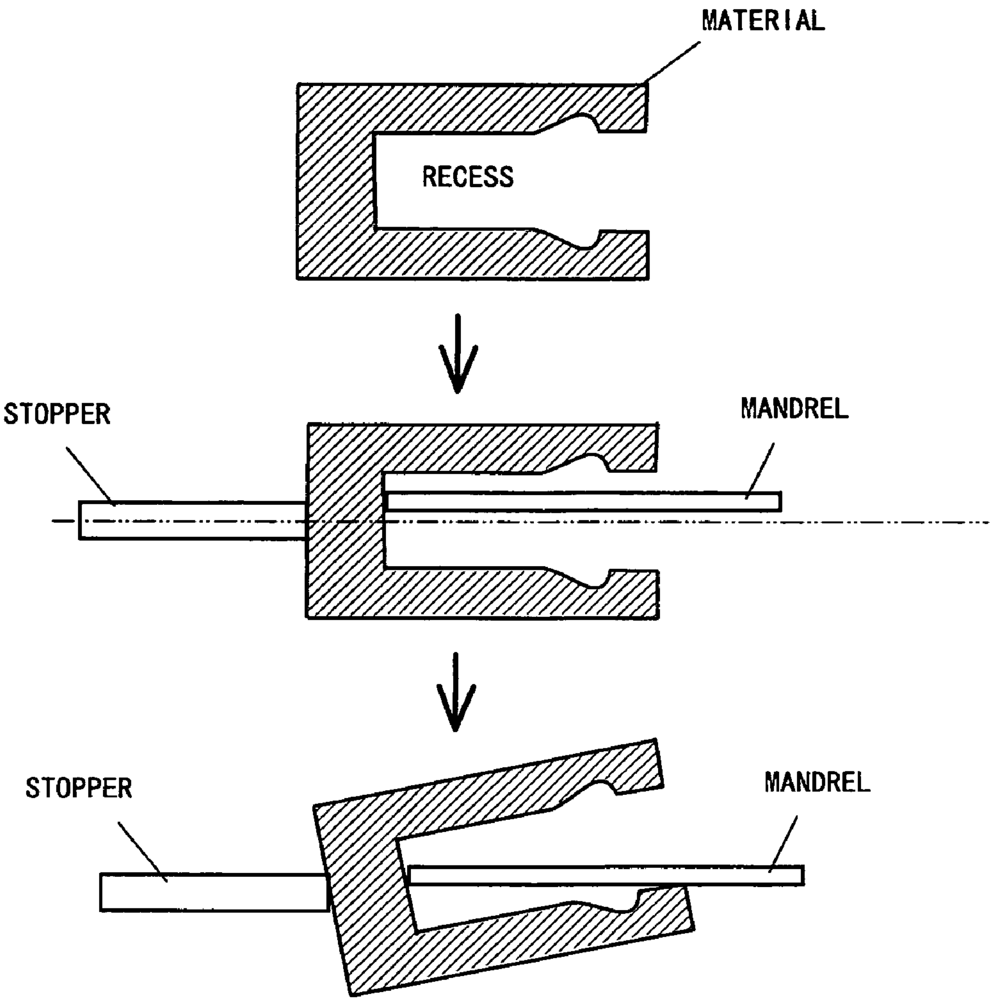

【FIG. 5】
(a)
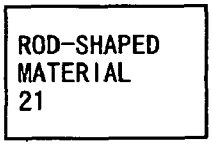
(b)
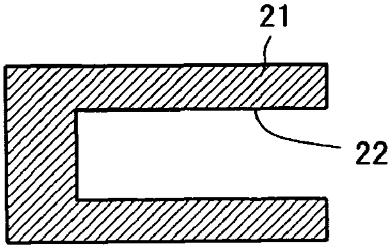
(c)
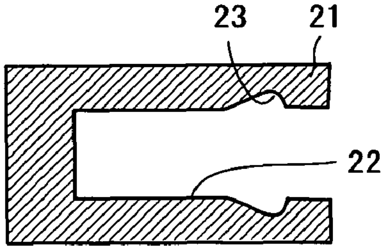
(d)
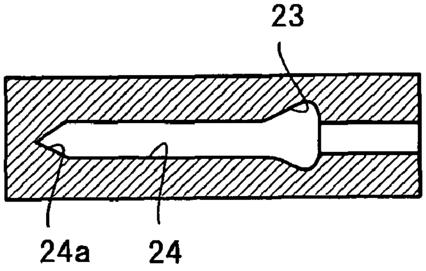
(e)
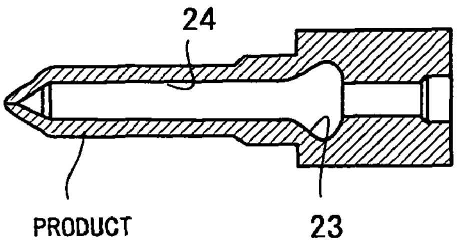

【FIG. 6】
(a)
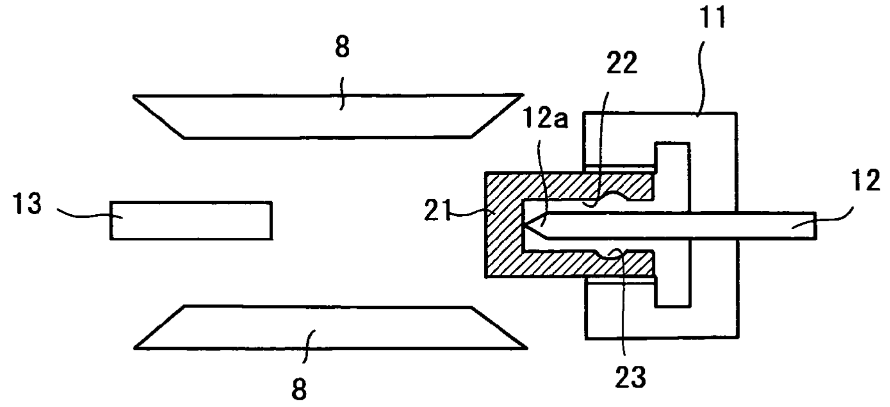
(b)
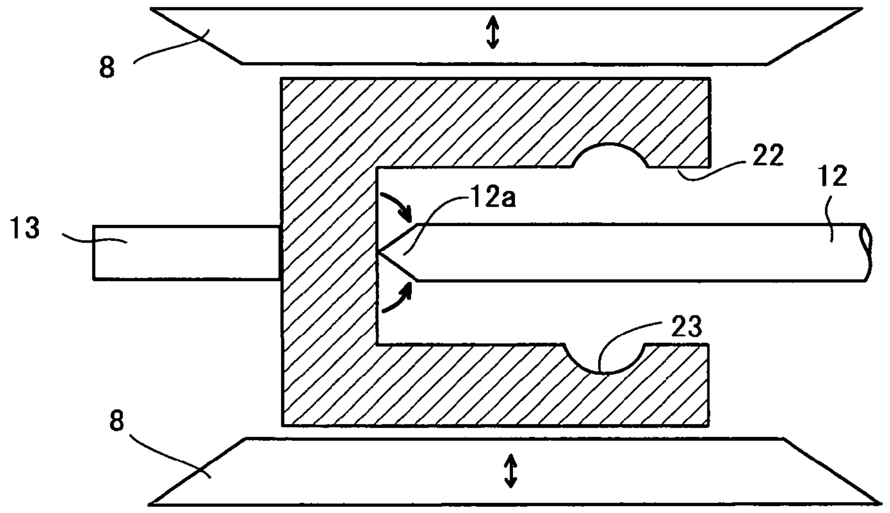
(c)
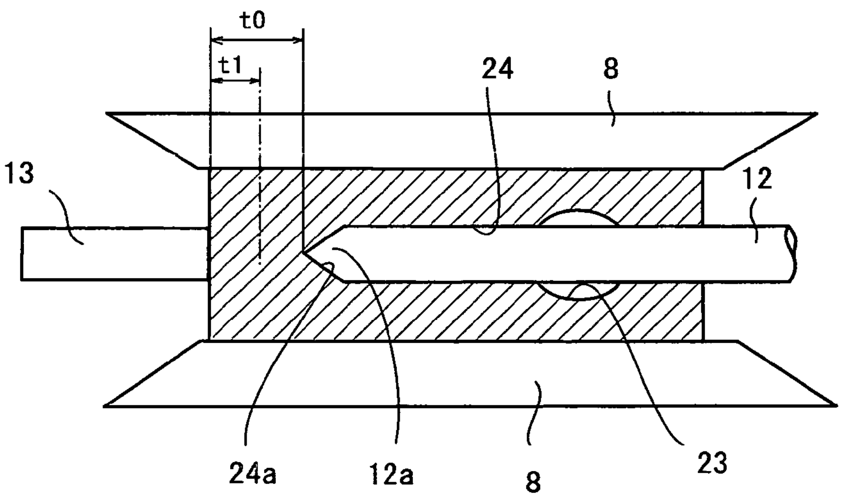

【FIG. 7】
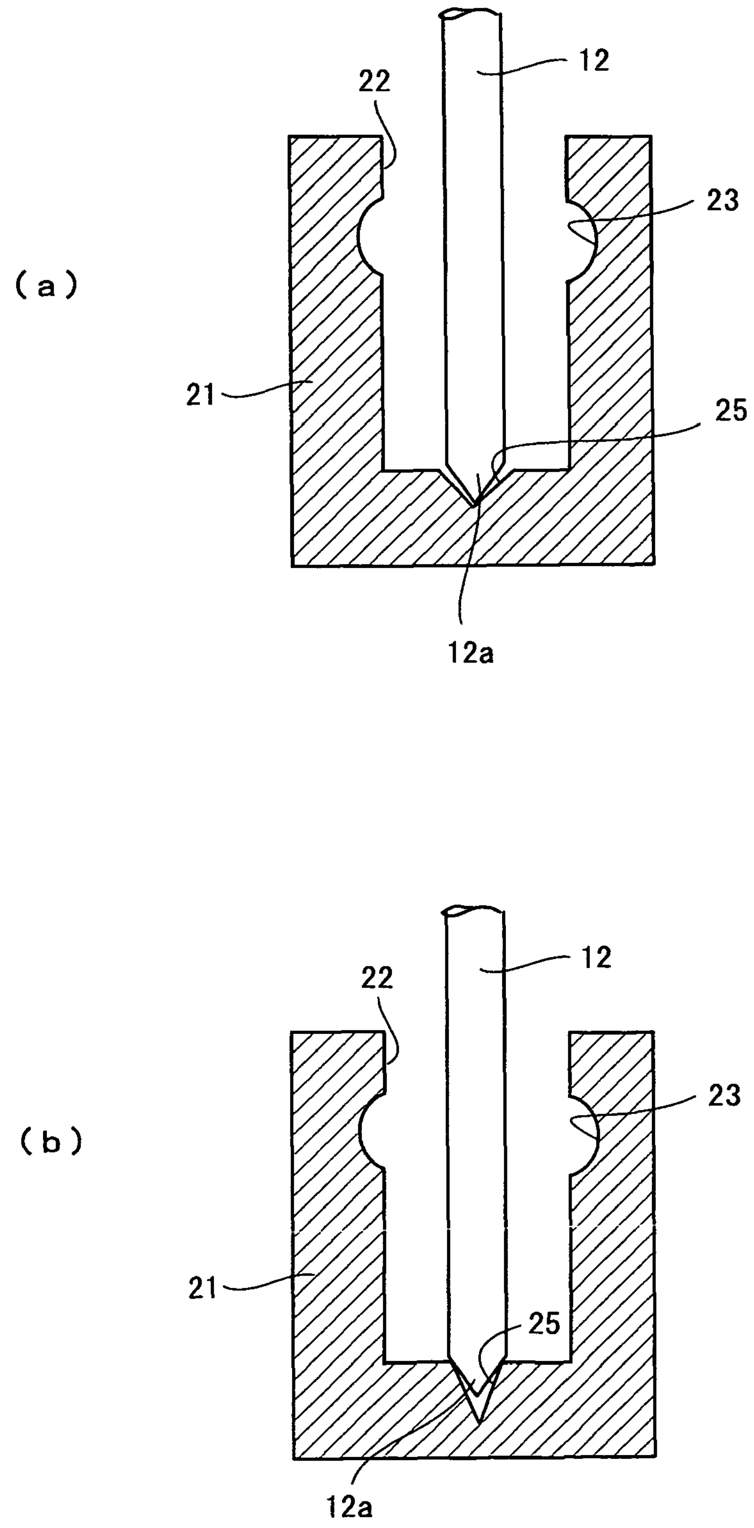

【FIG. 8】
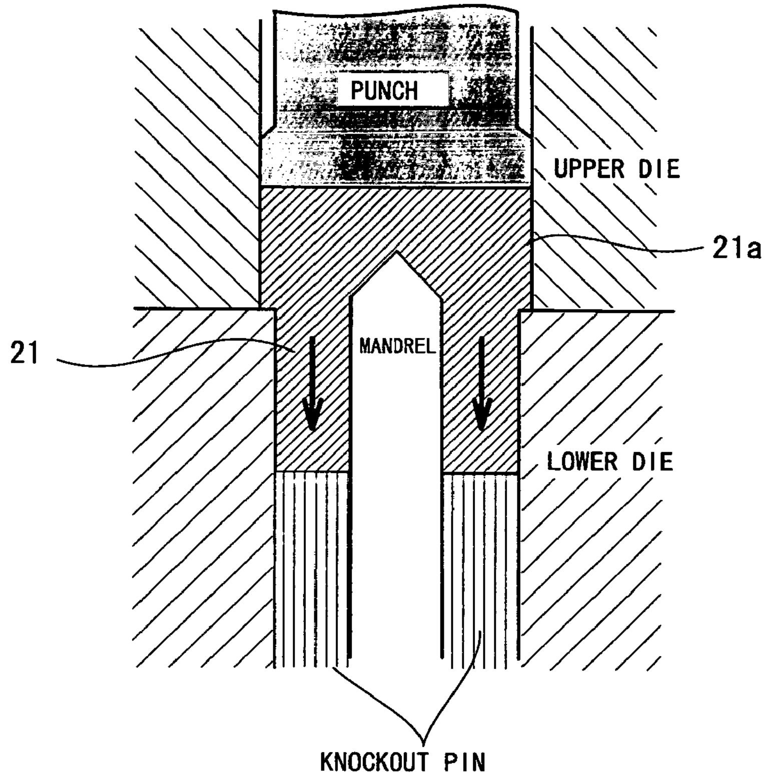
【FIG. 9】
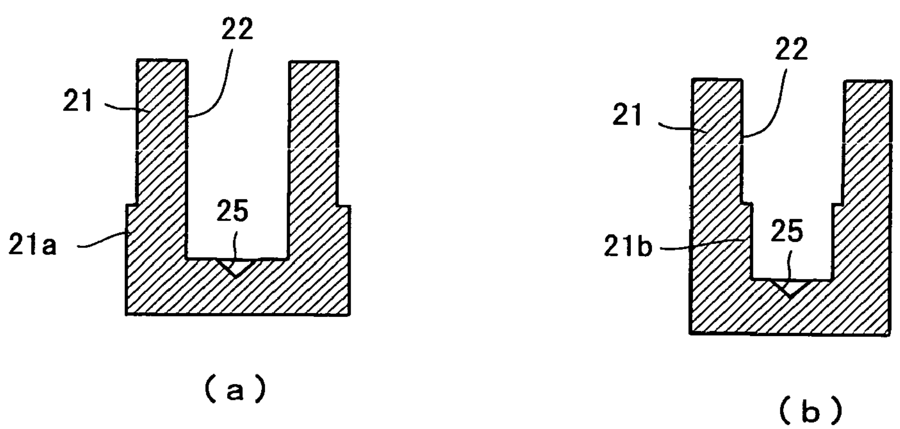

【FIG. 10】
(a)
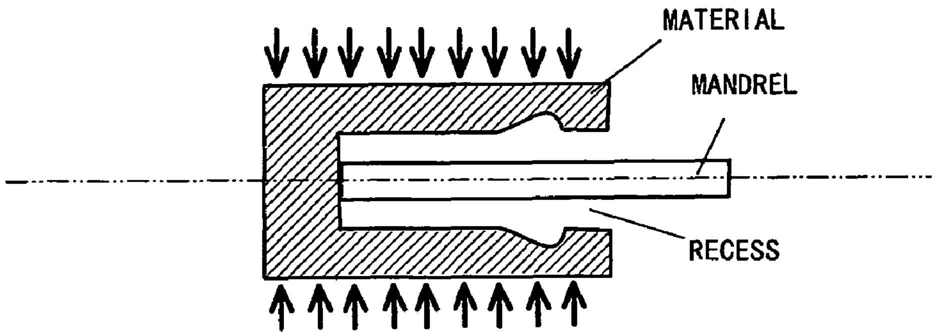
(b)
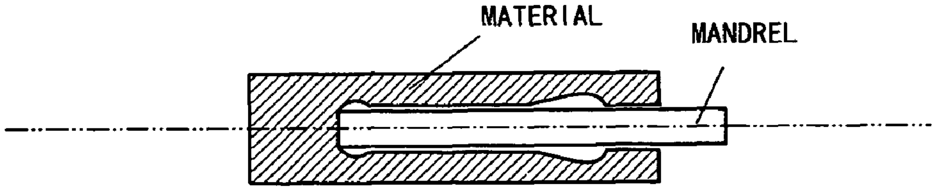
(c)
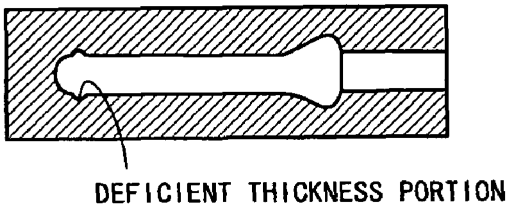

【FIG. 11】
(a)
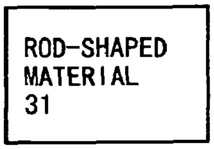
(b)
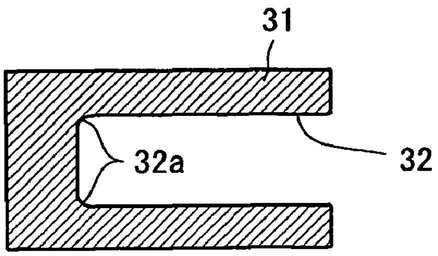
(c)
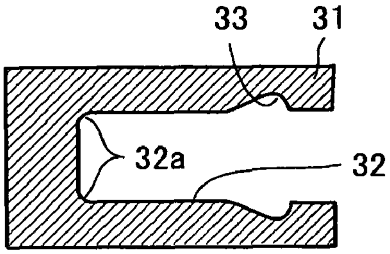
(d)
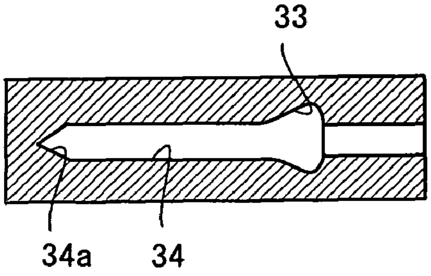
(e)
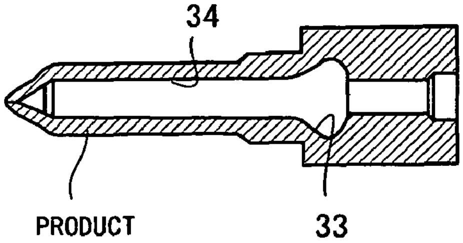

【FIG. 12】
(a)
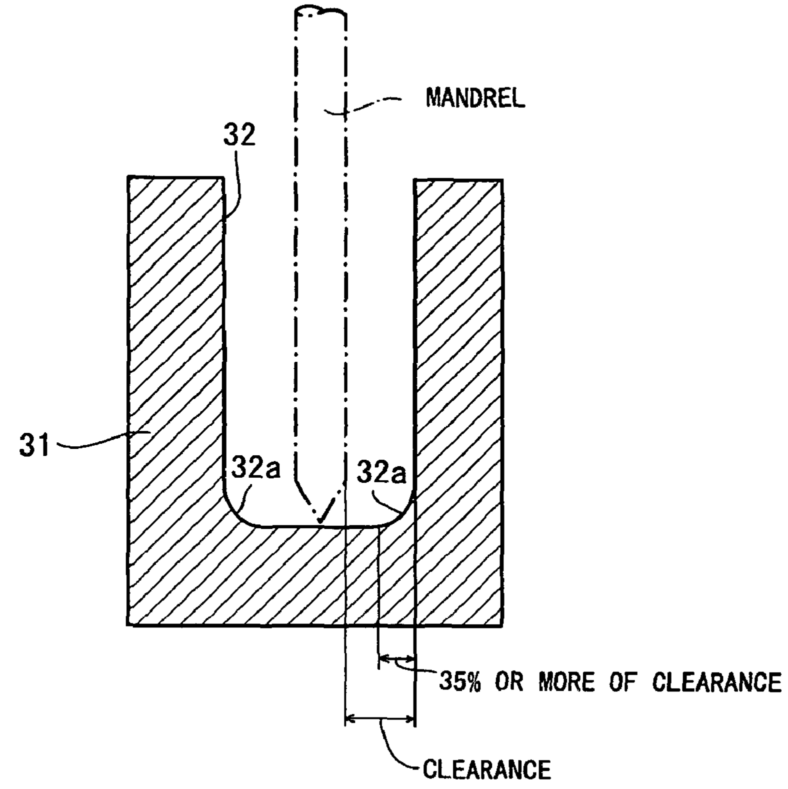
(b)
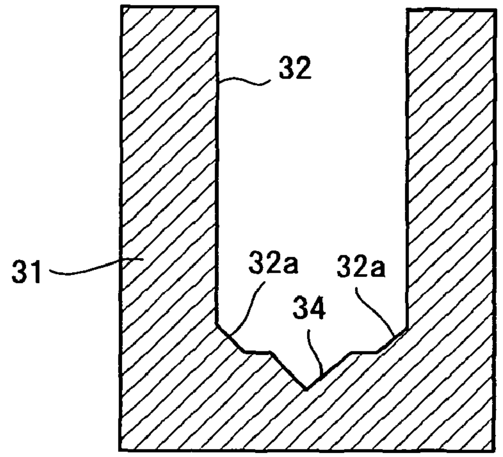

【FIG. 13】
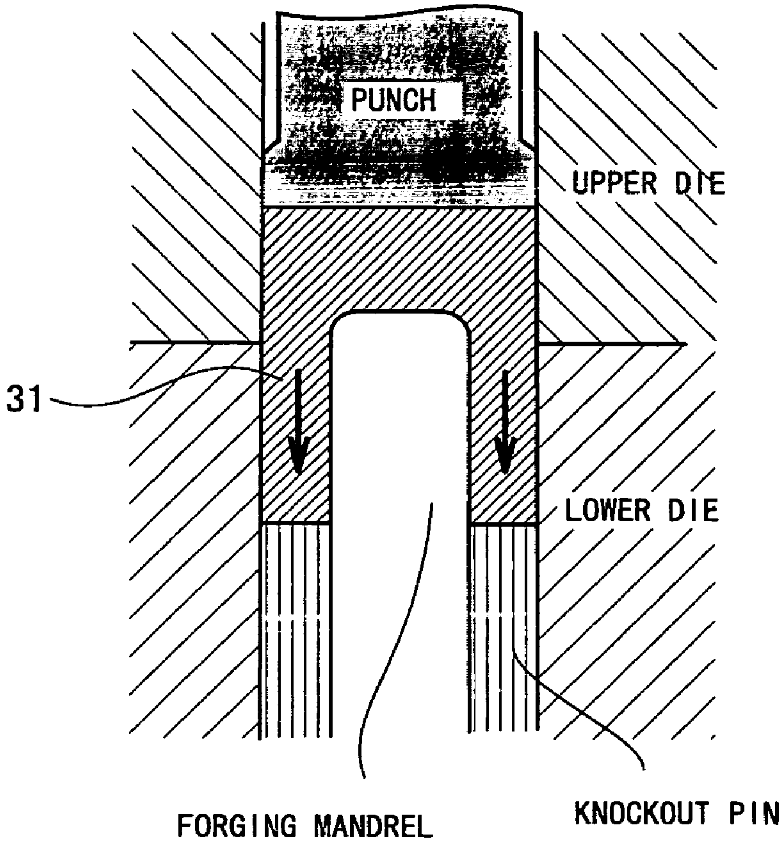

【FIG. 14】
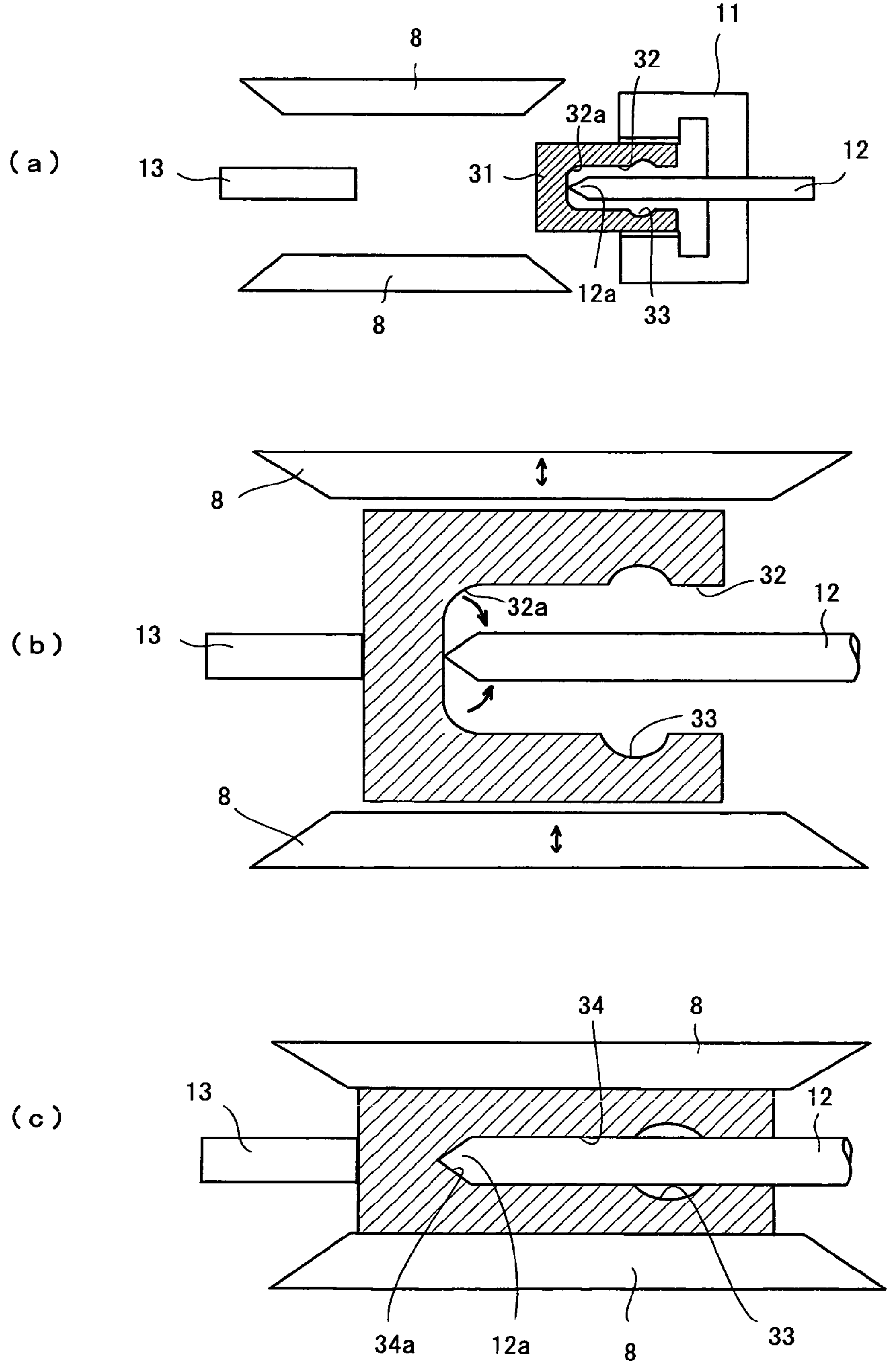

【FIG. 15】
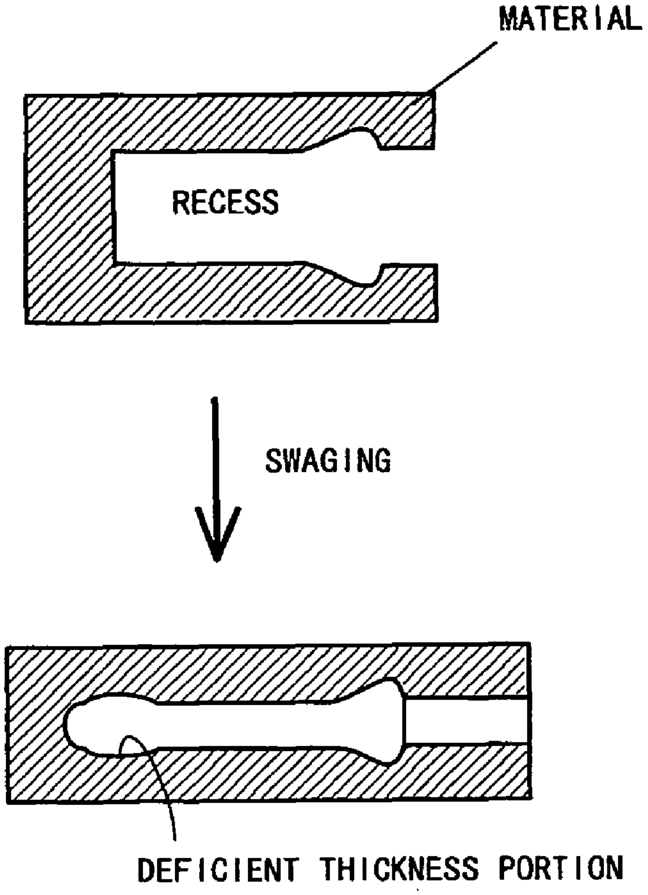

【FIG. 16】
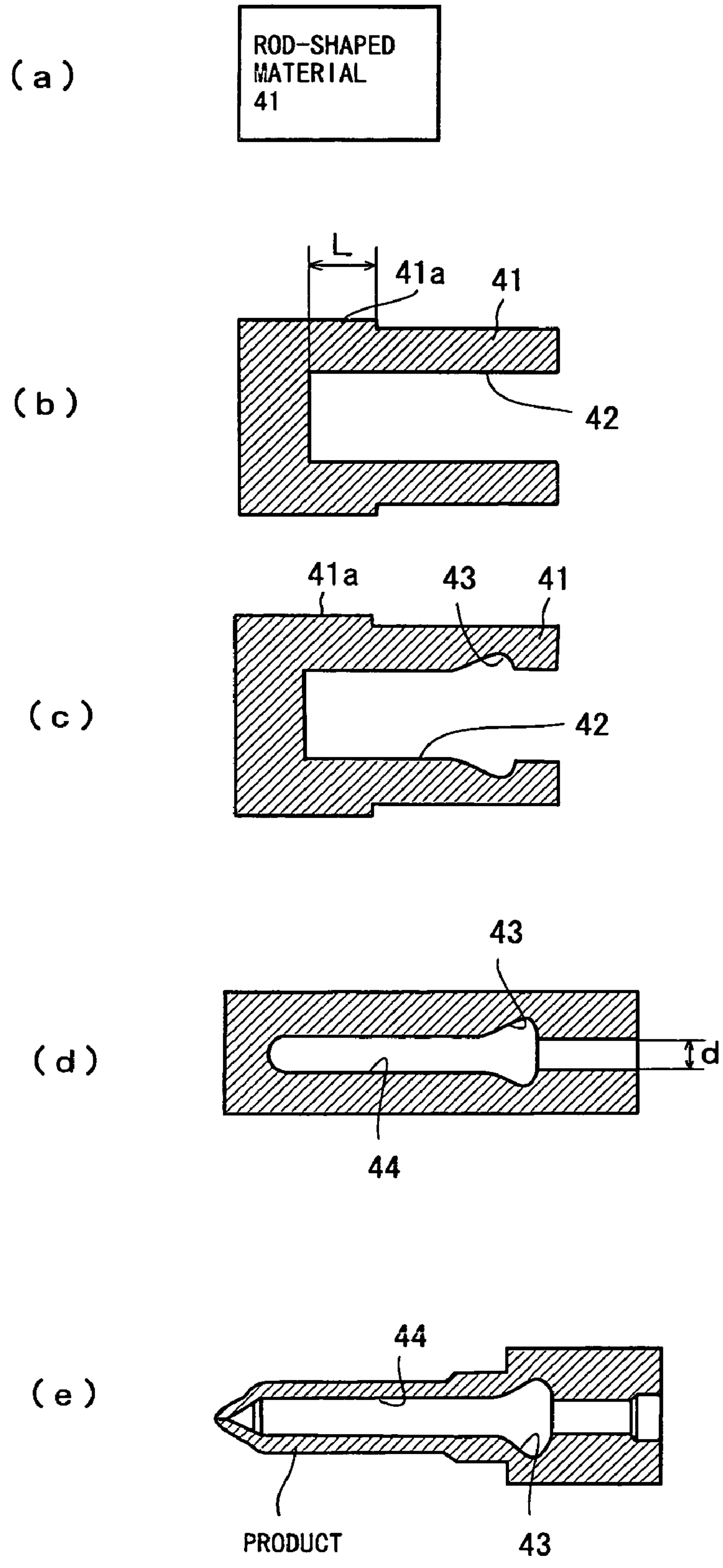

【FIG. 17】
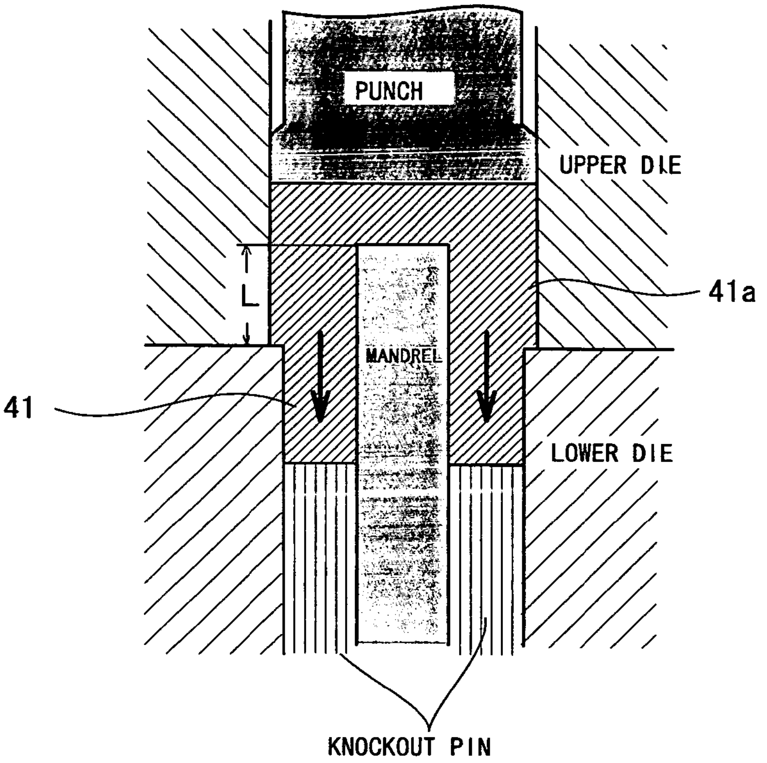
【FIG. 18】
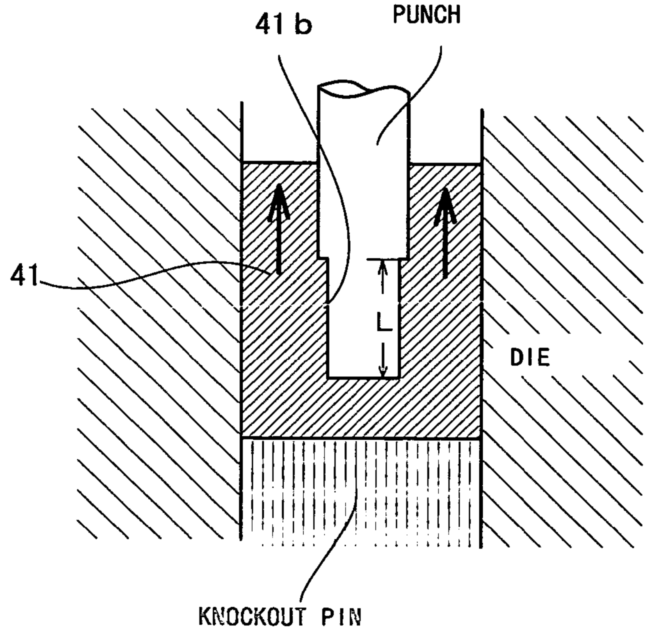

【FIG. 19】
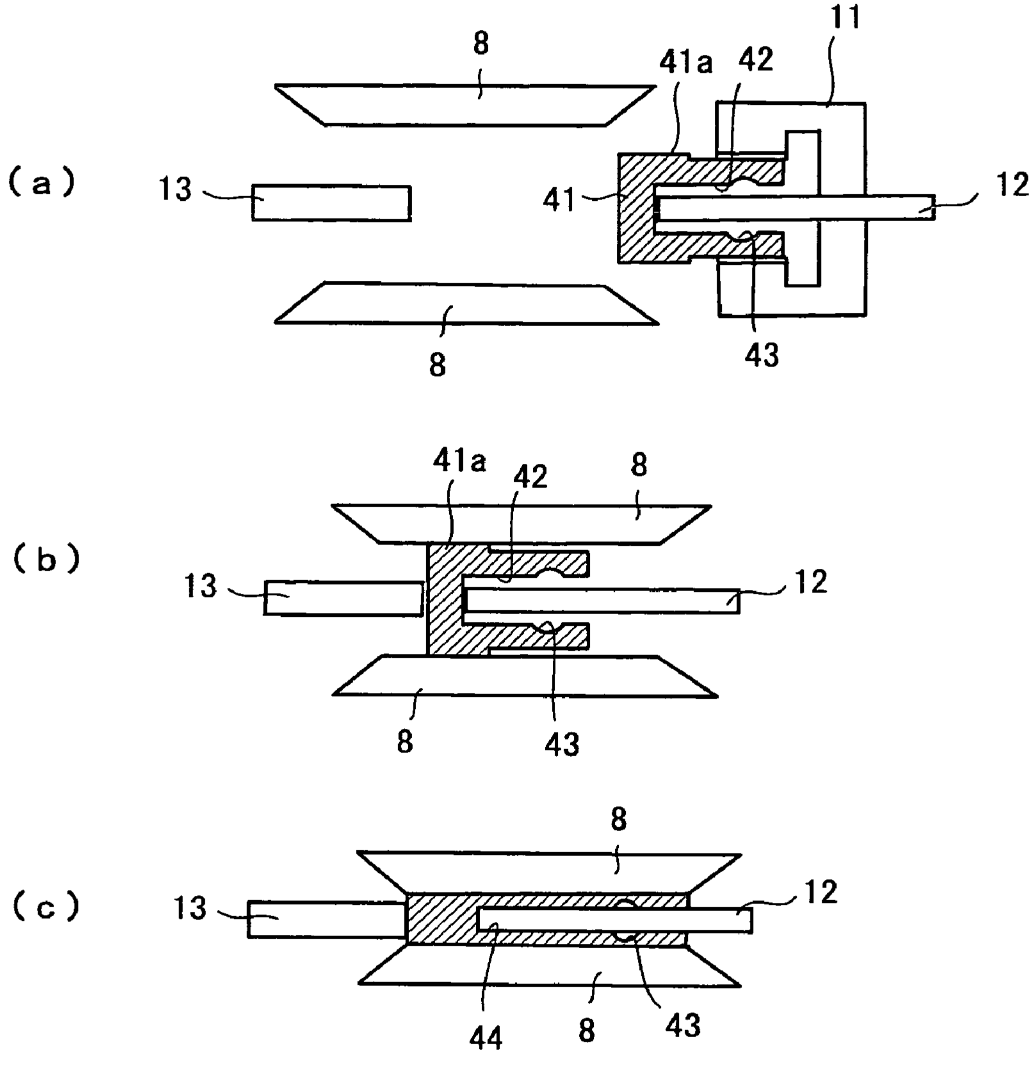

【FIG. 20】
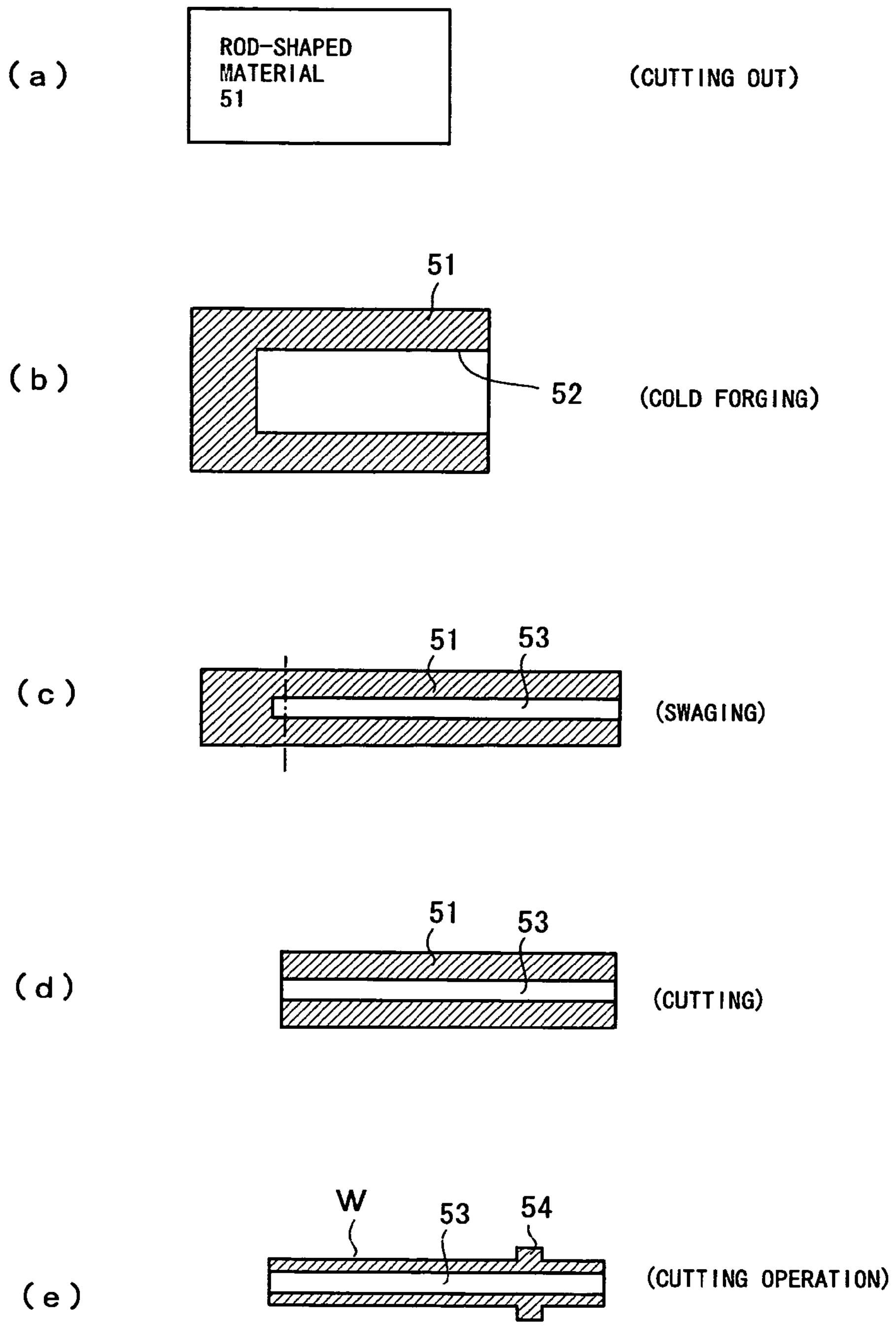

【FIG. 21】
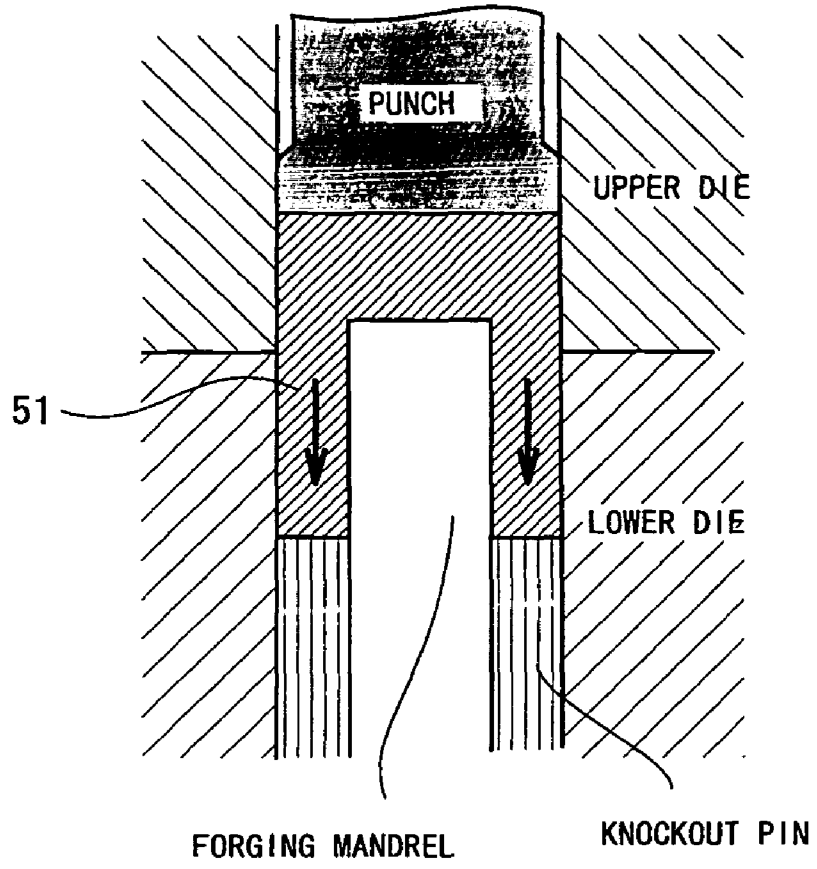

【FIG. 22】
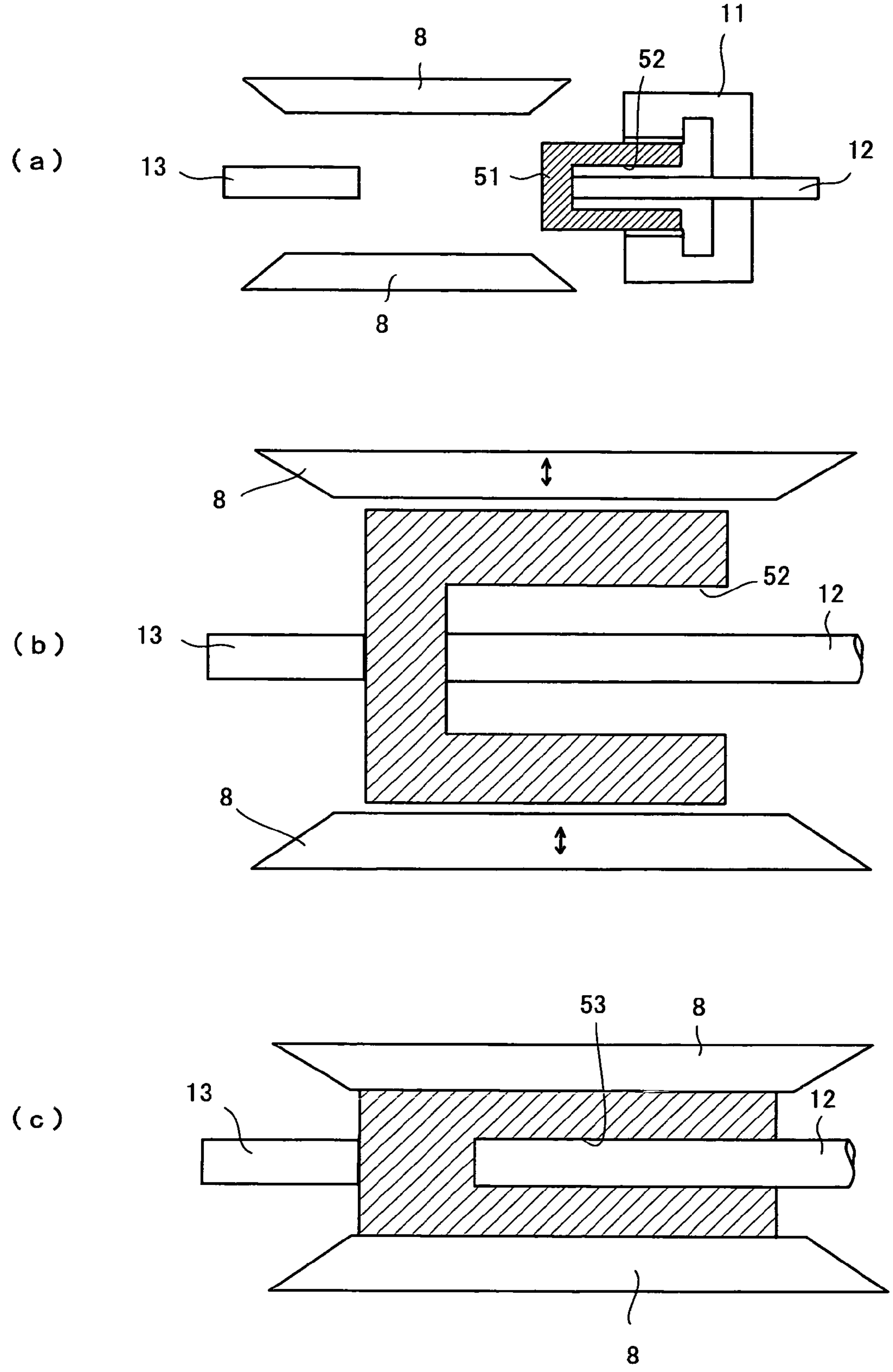

【FIG. 23】
(a)
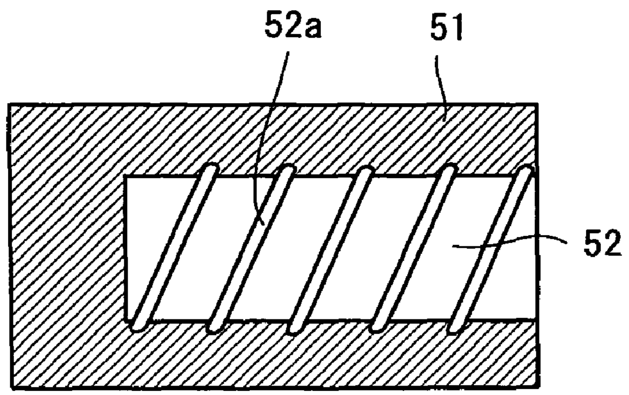
(b)
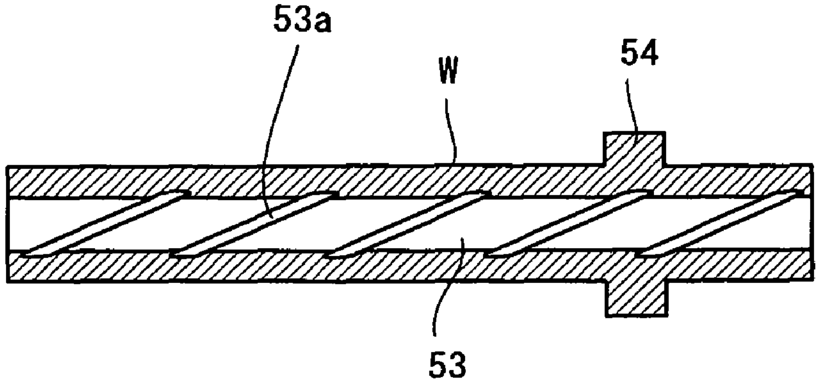

【FIG. 24】
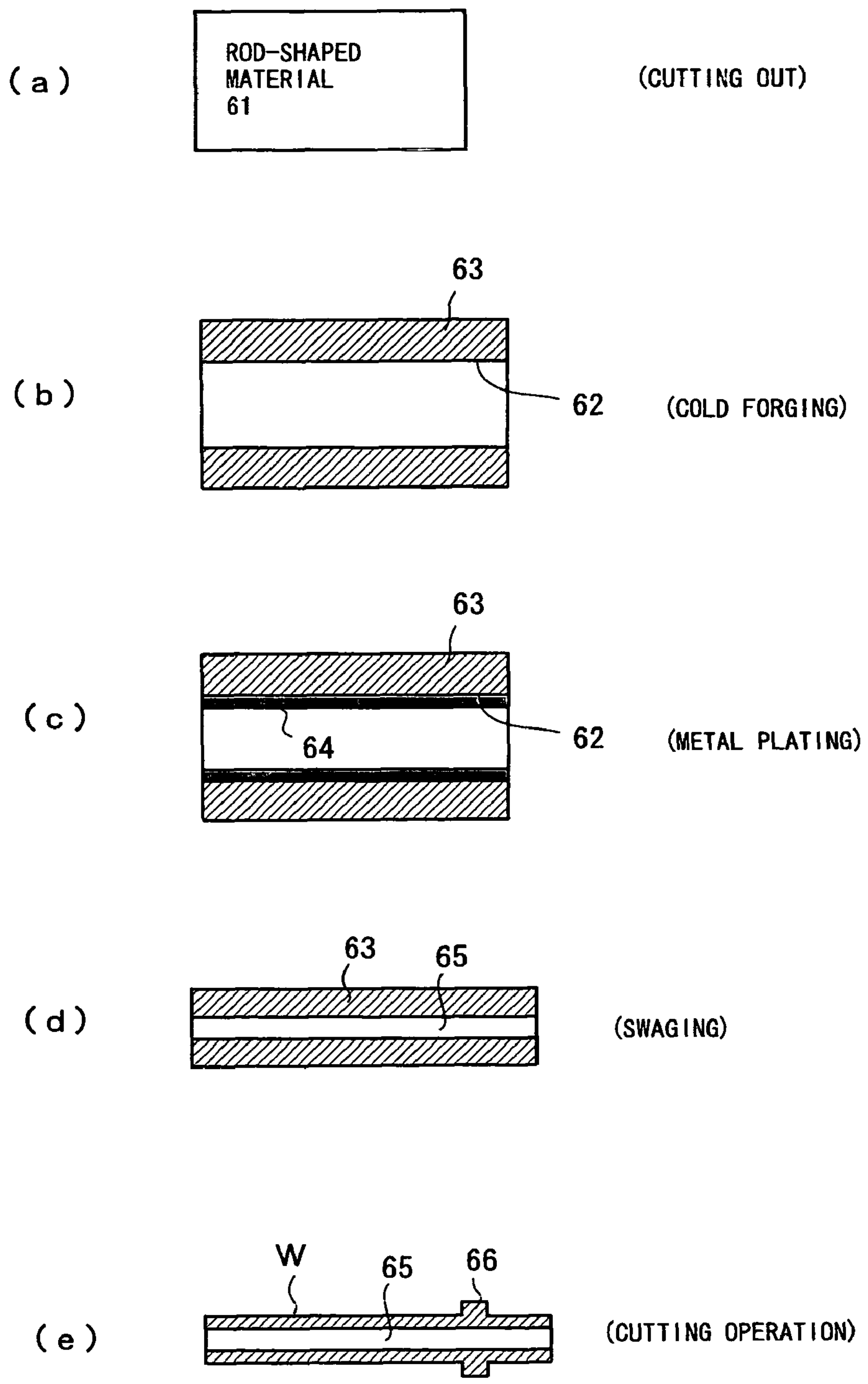

【FIG. 25】
(a)
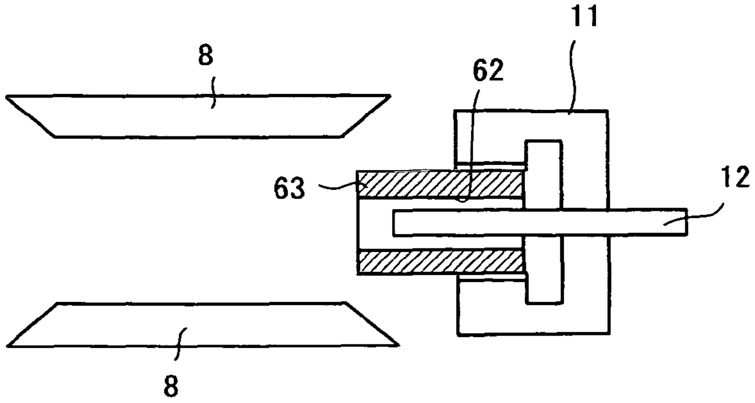
(b)
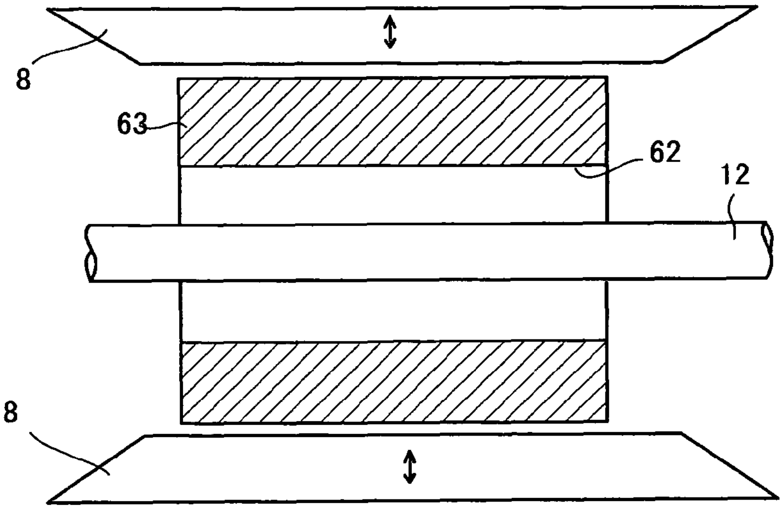
(c)
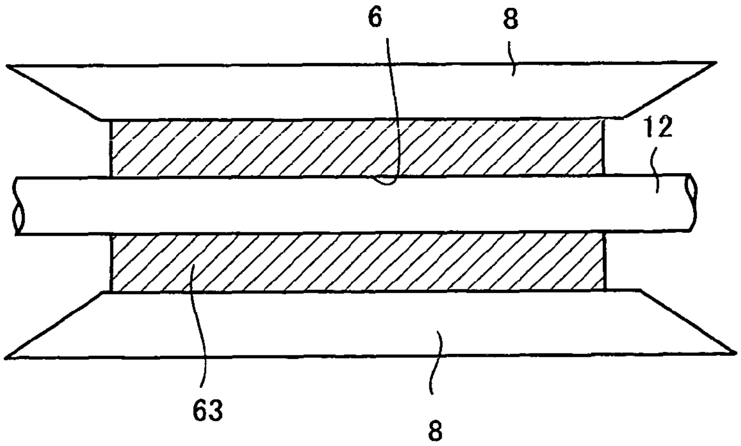

【FIG. 26】
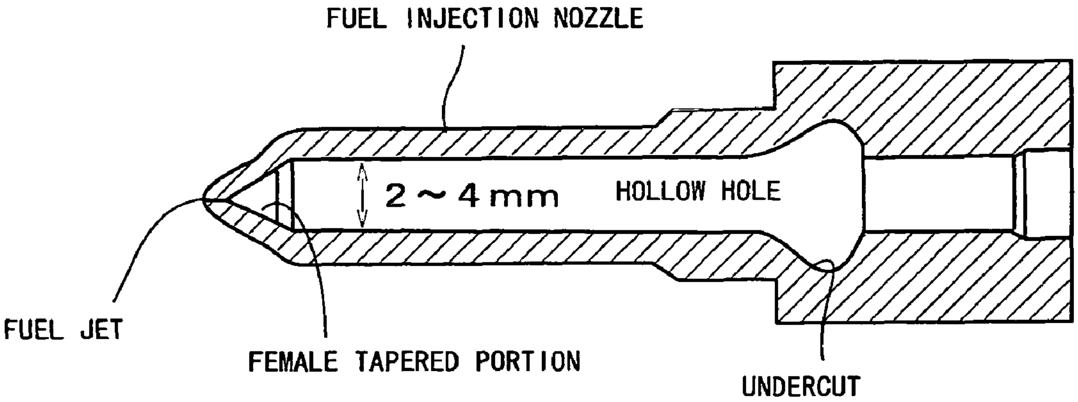

METHOD OF FORMING MEMBER, VALVE GUIDE AND METHOD OF FORMING THE SAME, AND METHOD OF FORMING TUBULAR MEMBER

TECHNICAL FIELD

The present invention relates to a method of forming a member having an undercut in a part of the inner periphery thereof, such as a fuel injection nozzle, a valve guide for slidingly guiding a valve system for an automotive engine and a method of forming the valve guide, and a method of forming a tubular member.

BACKGROUND ART

A general shape of a fuel injection nozzle is shown in FIG. 26. The fuel injection nozzle is formed with a hollow hole with an inside diameter of 2 to 4 mm in the axial direction. A fuel jet is formed at the tip end of the hollow hole, and an undercut serving as a fuel reservoir is formed in a far portion of the hollow hole.

It is when the diameter of the inner peripheral portion of the member is 10 mm at the smallest that the undercut can be formed by machining in the inside portion of the member. In order to form the undercut in the inner peripheral portion of the hollow hole with an inside diameter of 2 to 3 mm as in the case of the fuel injection nozzle, electrochemical machining has been performed conventionally.

Methods other than electrochemical machining include methods proposed in Patent Documents 1 to 3. Patent Document 1 has disclosed a technique in which a material is formed into a cup shape and the upper end peripheral edge of the cup-shaped material is expanded to the outside, and then the expanded upper end peripheral edge is projected to the inside by ironing from the outside using a die, resulting in the formation of an undercut on the inside of the material.

Patent Document 2 has disclosed a technique in which a rod-shaped material is put into a die whose inside diameter in the upper end portion thereof is larger than the diameter of the rod-shaped material, and the upper end of the rod-shaped material is pressed from the upside by using a punch having a diameter smaller than that of the rod-shaped material, by which the diameter of the upper end portion of the material is increased following the die shape, and an undercut is formed automatically when the small-diameter punch advances into the upper end of the rod-shaped material.

Patent Document 3 has disclosed a technique in which a material having a step portion that comes into contact with the shoulder portion of a die is set in the die having the shoulder portion, and a mandrel is inserted to an intermediate position of a blind hole formed in the material, and then the material is swaged by a punch in this state, by which a material in the upper half portion of die is deformed, and at the same time, an undercut is formed in the lower half portion of die without producing a flow of material to the inside in the radial direction.

Also, in an automotive engine, a slender, cylindrical valve guide is installed on a cylinder head to guide the reciprocating linear motion of valve stems of an intake valve and an exhaust valve. As a material for the valve guide, an iron sintered material or a copper-base alloy is generally used. However, with increasing engine output, there has been proposed the use of a material that is light in weight and has high heat resistance.

Also, a small-diameter guide hole is formed in the valve guide installed on the cylinder head of engine, and the valve stem of the intake valve or the exhaust valve is inserted through this guide hole so as to slide at a high speed and be used at high temperatures. Therefore, the valve guide is required to have high wear resistance, seizure resistance, scuff resistance, and heat conductivity.

To meet the above-described requirements, a sintered material of Fe alloy has conventionally been used as a material for the valve guide. However, this material has a drawback of increased weight.

Thereupon, Patent Document 4 has proposed a method in which a molten aluminum-silicon alloy is quenched, solidified, and deposited while being gas atomized to manufacture an ingot, and the ingot is extrusion molded into a tubular shape and is cut to a predetermined size, by which a valve guide is obtained.

Also, Patent Document 5 has proposed a method in which although not limited to the method of forming the valve guide, a molded product obtained by preforming quenched and solidified aluminum alloy powder at a temperature not lower than ordinary temperature and not higher than 300° C. is forged at a temperature of 450° C. to 540° C. as a method of manufacturing an aluminum alloy having high heat resistance.

Patent Document 1: Japanese Patent Application Publication No. 56-59552

Patent Document 2: Japanese Patent Application Publication No. 3-207545

Patent Document 3: Japanese Patent Application Publication No. 8-90140

Patent Document 4: Japanese Patent Application Publication No. 11-350059

Patent Document 5: Japanese Patent Application Publication No. 6-145921

In the case where a member having an undercut is manufactured by electrochemical machining, a cleaning process is always necessary, and a problem of disposal of waste liquid produced by polishing etc. occurs.

On the other hand, in Patent Documents 1 to 3, the location at which the undercut is provided is restricted. That is to say, in Patent Document 1, the undercut is formed in the whole of material, in Patent Document 2, the location at which the undercut is provided is restricted to the upper end portion of material, and in Patent Document 3, the location is restricted to a far portion of the hole formed in the axial direction.

Also, in all of Patent Documents 1 to 3, since the undercut is formed by bending the material itself, it is difficult to make the shape of undercut fixed, and the product yield is lower.

On the other hand, regarding the valve guide, as described above, the quenched and solidified aluminum alloy powder obtained by the atomization process as in Patent Documents 4 and 5 has high wear resistance, heat resistance, and seizure resistance, so that the use of this powder as a material for the valve guide of engine etc. reduces the weight.

However, the quenched and solidified aluminum alloy powder is not only high in cost but also unsuitable for forming a tubular member having a small-diameter guide hole as in the case of the valve guide because of the difficulty in machining. That is to say, the tubular member is manufactured by hot extrusion, so that the service life of die is short and the energy for heating is required, which poses problems in terms of equipment and cost.

DISCLOSURE OF THE INVENTION

To solve the above-described problems, the present invention provides a method of forming a member having an inside-diameter portion with a small diameter, including the steps of forming a large-diameter recess in a material; and swaging the material from the outside by inserting a mandrel having a diameter equal to the diameter of the inner peripheral portion of an aimed member into the recess.

Specifically, a method of forming a member having an undercut in accordance with a first invention has solved the above problems by including the steps of:

1: forming a recess having a diameter larger than that of the inner peripheral portion of the member in a material by forging etc.;

2: forming an undercut at the inner periphery of the recess;

3: inserting a mandrel having a diameter equal to the diameter of the inner peripheral portion of an aimed member into the recess of the material having been formed with the undercut; and 4: swaging, from the outside, the material into which the mandrel has been inserted so that the inside diameter of the recess of the material is decreased to the outside diameter of the mandrel with the undercut left.

Subsequently, the external shape of the aimed product, for example, a fuel injection nozzle is formed by turning etc.

A method of forming a member having an undercut in accordance with a second invention includes the steps of forming a recess having a diameter larger than that of the inner peripheral portion of the member in a material; forming an undercut at the inner periphery of the recess; inserting a mandrel having a diameter equal to the diameter of the inner peripheral portion of an aimed member and having a conical tip end portion into the recess of the material having been formed with the undercut; and swaging, from the outside, the material into which the mandrel has been inserted, whereby the inside diameter of the recess of the material is decreased to the outside diameter of the mandrel with the undercut left, and at the same time, the tip end portion of the inner peripheral portion of the aimed member is formed into a female taper shape following the tip end portion of the mandrel.

By the above-described configuration, the undercut in the inner peripheral portion and the female tapered portion at the tip end can be formed simultaneously, and also since the depth of the female tapered portion is equal to the length of the conical portion in the mandrel tip end portion, longitudinal indicia at the time when a grinding allowance in post-machining is determined can be obtained.

In the method of forming a member having an undercut in accordance with the second invention, it is preferable that a positioning hole into which the mandrel tip end portion is inserted be formed in advance in the center of the large-diameter recess, the positioning hole having a depth equal to or shallower than the length of the mandrel tip end portion and an opening angle being equal to or larger than the angle of the mandrel tip end portion.

By forming the positioning hole in advance in this manner, the position of mandrel is prevented from shifting. If the positioning hole is formed by forging at the same time that the recess is formed, the production efficiency is higher.

A method of forming a member having an undercut in accordance with a third invention includes the steps of forming a recess having a diameter larger than that of the inner peripheral portion of the member in a material; forming an undercut at the inner periphery of the recess; inserting a mandrel having a diameter equal to the diameter of the inner peripheral portion of an aimed member into the recess of the material having been formed with the undercut; and swaging, from the outside, the material into which the mandrel has been inserted so that the inside diameter of the recess of the material is decreased to the outside diameter of the mandrel with the undercut left, and is characterized in that a chamfered portion is formed in the bottom portion of the recess of the material before the swaging operation, and the formation region of the chamfered portion is within an outside region that provides a clearance in a state in which the tip end of the mandrel abuts on the bottom portion of the recess.

In the method of forming a member in accordance with the third invention, although the material flows in the opening direction along the lengthwise direction at the time of swaging operation, if the chamfered portion is provided at the corner of the bottom portion of the recess as in the above-described configuration, even if the material flows, the material does not run short in the corner portion, so that no deficient thickness is produced. Also, the formation region of the chamfered portion is preferably 35 to 100% of a clearance between the mandrel and the inner periphery of the recess. If the formation region is less than 35%, the material may run short, and if it exceeds 100%, the mandrel tip end portion overlaps with the chamfered portion, so that the position of mandrel becomes unstable.

Also, a method of forming a member having an undercut in accordance with a fourth invention includes the steps of forming a recess having a diameter larger than that of the inner peripheral portion of an aimed member in a material; forming an undercut at the inner periphery of the recess; inserting a mandrel having a diameter equal to the diameter of the inner peripheral portion of the aimed member into the recess of the material having been formed with the undercut; and swaging, from the outside, the material into which the mandrel has been inserted so that the inside diameter of the recess of the material is decreased to the outside diameter of the mandrel with the undercut left, and is characterized in that an excess thickness portion is provided in advance in a predetermined length range from the bottom of the recess at the inner or outer periphery of the recess of the material before the swaging operation.

If the excess thickness portion is formed by forging at the same time that the recess is formed, the production efficiency is higher.

Also, a valve guide in accordance with a fifth invention is formed of an Al-base composite material that is light in weight and has high heat resistance, seizure resistance, and wear resistance. The valve guide is provided with an oil groove in advance in the inner peripheral surface thereof because the Al-base composite material has lower lubricity than the conventional sintered material and cast iron material.

Further, a method of forming the valve guide in accordance with the fifth invention includes the steps of forming a recess having a diameter larger than that of the inner peripheral portion into which the valve stem is inserted in a valve material; and swaging, from the outside, the material into which a mandrel has been inserted so that the inside diameter of the recess of the material is decreased to the outside diameter of the mandrel by inserting the mandrel having almost the same diameter as that of the valve stem into the large-diameter recess.

Also, in the case where an Al-base composite material is selected as the material, it is necessary to enhance the lubricity. Therefore, it is preferable that a groove that remains as the oil groove be formed in advance in the step before the swaging step.

Also, a method of forming a tubular member in accordance with a sixth invention includes the steps of obtaining an intermediate material such that the diameter of an inside-diameter hole has a dimension allowing metal plating; forming a metallic deposit in the inside-diameter hole of the intermediate material; and swaging, from the outside diameter side, the intermediate material into which a mandrel has been inserted so that the diameter of the inside-diameter hole of the intermediate material is decreased to the outside diameter of the mandrel by inserting the mandrel having a diameter corresponding to the diameter of the small-diameter hole of an aimed tubular member into the inside-diameter hole of the intermediate material formed with the metallic deposit.

By doing this, the metallic deposit can be formed even on the peripheral surface of the small-diameter hole that has been unable to be metal plated conventionally.

In the method of forming a tubular member in accordance with the sixth invention, as a material for the tubular member, a general aluminum alloy and aluminum-base composite material are conceivable. The use of these metals can reduce the weight. Also, as a material for the metallic deposit, a material having high wear resistance, such as iron (Fe) or nickel-silicon carbide (Ni-SiC), is conceivable. The aluminum-base composite material has high heat resistance and wear resistance, but has lower lubricity than the conventional sintered material and cast iron material. Therefore, in the case where the aluminum-base composite material is used as a material for a tubular member, the provision of metallic deposit consisting of a material having high wear resistance, such as iron (Fe) or nickel-silicon carbide (Ni—SiC), is very effective when the tubular member is used, for example, as a valve guide.

According to the first invention, the undercut can be formed even in the inner peripheral portion of a blind hole etc. having an inside diameter not larger than 10 mm, which is difficult to machine. Also, no waste liquid is produced as the result of machining, so that this method is advantageous in terms of environmental hygiene. Also, the time taken for the present process can be shortened significantly compared with the conventional process.

Further, the undercut can be formed by machining in advance instead of by bending the material, so that the shape thereof is correct. Therefore, by applying this method to a member requiring a correct shape, such as a fuel injection nozzle, the product yield can be improved.

According to the second invention, the method in accordance with the present invention does not produce waste fluid as compared with the electrochemical machining, so that this method is advantageous in terms of environmental hygiene, and also the shape of the undercut is correct because the undercut can be formed by machining in advance. Also, as the final shape, the undercut and the female tapered portion can be formed simultaneously even in the inner peripheral portion of the blind hole etc. having an inside diameter not larger than 10 mm, which is difficult to machine. In particular, by forming, in advance, the positioning hole into which the mandrel tip end is inserted, the material can be prevented from tilting at the time of swaging operation, and hence longitudinal indicia can be obtained.

According to the third invention, the method in accordance with the present invention does not produce waste fluid as compared with the electrochemical machining, so that this method is advantageous in terms of environmental hygiene, and also the shape of the undercut is correct because the undercut can be formed by machining in advance. Also, as the final shape, the undercut can be formed even in the inner peripheral portion of the blind hole etc. having an inside diameter not larger than 10 mm, which is difficult to machine. In particular, by forming, in advance, the chamfered portion in the bottom portion of the recess of the material before the swaging operation, a shortage of material at the time of swaging operation can be compensated by the material of the chamfered portion, so that the production of deficient thickness can be prevented.

According to the fourth invention, the method in accordance with the present invention does not produce waste fluid as compared with the electrochemical machining, so that this method is advantageous in terms of environmental hygiene, and also the shape of the undercut is correct because the undercut can be formed by machining in advance. Also, as the final shape, the undercut can be formed even in the inner peripheral portion of the blind hole etc. having an inside diameter not larger than 10 mm, which is difficult to machine. In particular, by providing the excess thickness portion, a shortage of material at the time of swaging operation can be compensated, so that the production of deficient thickness can be prevented.

According to the fifth invention, the valve guide in accordance with the present invention is lighter in weight and has higher lubricity than the conventional valve guide. Therefore, this valve guide is less liable to seize and wear.

Also, the cutting tool need not be changed as compared with the conventional cutting operation. Also, although with the conventional forging method, it has been impossible to form a long tubular valve guide with a small inside diameter, according to the method of the present invention, such a valve guide can be formed easily. In particular, the oil groove can be formed easily in the inner peripheral portion.

According to the sixth invention, the metallic deposit can be formed even on the inner peripheral surface of the small-diameter hole on which the metallic deposit has not been unable to be formed with the conventional method. Therefore, for example, a lightweight aluminum alloy is used as the material for the valve guide and the metallic deposit having high wear resistance can be formed on the inner peripheral surface of the small-diameter hole, so that the weight of the valve guide can be reduced, which improves the fuel economy.

BRIEF DESCRIPTION OF THE DRAWINGS

FIG. 1 is a block diagram for illustrating a forming process in accordance with a first invention;

FIG. 2 is a front view of a device used for swaging in a forming process in accordance with a first invention;

FIG. 3 is views for illustrating the details of swaging operation in a forming process in accordance with a first invention;

FIG. 4 is a view for illustrating an improvement left in a first invention;

FIG. 5 is a block diagram for illustrating a forming process in accordance with a second invention;

FIG. 6 is views for illustrating the details of swaging operation in a forming process in accordance with a second invention;

FIG. 7(*a*) is a sectional view of a material formed with a positioning hole, and FIG. 7(*b*) is a view for illustrating an unfavorable positioning hole;

FIG. 8 is a view for illustrating a process for forming a positioning hole by forging;

FIGS. 9(*a*) and 9(*b*) are sectional views of materials in which an excess thickness portion is formed;

FIG. 10 is views for illustrating an improvement left in a first invention;

FIG. 11 is a block diagram for illustrating a forming process in accordance with a third invention;

FIGS. 12(*a*) and 12(*b*) are sectional views of materials;

FIG. 13 is a view for illustrating a process for forming a recess in a material by forging;

FIGS. 14(*a*) to 14(*c*) are views for illustrating the details of swaging operation in a forming process in accordance with the present invention;

FIG. 15 is a view for illustrating an improvement left in a first invention;

FIG. 16 is a block diagram for illustrating a forming process in accordance with a fourth invention;

FIG. 17 is a view for illustrating a process for forming an excess thickness portion;

FIG. 18 is a view for illustrating a process for forming an excess thickness portion;

FIG. 19 is views for illustrating the details of swaging operation in a forming process in accordance with a fourth invention;

FIG. 20 is a block diagram for illustrating a forming process in accordance with a fifth invention;

FIG. 21 is a view for illustrating a process for forming a recess in a material by forging;

FIGS. 22(*a*) to 22(*c*) are views for illustrating the details of swaging operation in a forming process in accordance with a fifth invention;

FIGS. 23(*a*) to 23(*b*) are views for illustrating another example;

FIGS. 24(*a*) to 24(*e*) are block diagrams for illustrating a forming process in accordance with a sixth invention;

FIGS. 25(*a*) to 25(*c*) are views for illustrating the details of swaging operation in a forming process in accordance with the present invention; and FIG. 26 is a sectional view of a conventional fuel injection nozzle.

BEST MODE FOR CARRYING OUT THE INVENTION

Specific examples will now be described with reference to the accompanying drawings.

First Invention

First, a rod-shaped material 1 is prepared by cutting a billet shown in FIG. 1(*a*). As this rod-shaped material, SCM415 etc. are suitable.

Subsequently, as shown in FIG. 1 (*b*), a recess 2 is formed in the rod-shaped material 1 by cold forging (forward extrusion or backward extrusion). This recess 2 is a portion that forms the inner peripheral portion of product subsequently. The recess 2 is formed so as to have a diameter larger than that of the inner peripheral portion of product and have a diameter so large that the recess 2 can be machined satisfactorily (not smaller than 10 mm).

Next, as shown in FIG. 1(*c*), an undercut 3 is formed in the recess 2, and successively, as shown in FIG. 1(*d*), the recess 2 is formed into a blind hole 4 having an inside diameter of 2 to 4 mm by cold swaging. Further, the outer peripheral surface is machined by turning to obtain a product (fuel injection nozzle) shown in FIG. 1(*e*).

The machining method for the material is not limited to plunge machining in which a tool is moved in the radial direction as shown in the figure, and infeed machining in which the material is moved in the axial direction may be performed. Also, the turning can be omitted by forming the tip end portion of the swaging die into a predetermined shape in advance.

Now, a device for performing the swaging operation is explained. As shown in FIG. 2, a swaging device has an inside rotor 5 and an outside rotor 6. In the inside rotor 5, through holes 7 extending in the radial direction are formed at 90° intervals, and a swaging die 8 and a striker 9 are slidably fitted in each of the through holes 7 in the named order from the inside. On the other hand, in the outside rotor 6, twelve pins 10 are rotatably held at equal intervals in the circumferential direction.

In the above-described swaging device, when the inside rotor 5 is turned clockwise and the outside rotor 6 is turned counterclockwise, the swaging die 8 and the striker 9 that are held in the inside rotor 5 are urged to the outside in the radial direction by a centrifugal force. Since the outside rotor 6 turns on the outside and a part of each of the pins 10 held in the outside rotor 6 projects to the inside from the outside rotor 6, the pin 10 pushes the striker 9 inward in the radial direction each time the pin 10 passes through the outer end portion of the striker 9. Accordingly, the swaging die 8 is also pushed inward in the radial direction to strike the surface of the material set in the center of the four swaging dies 8 at a rate of several thousand cycles per minute to perform swaging operation.

In order to form the material 1 formed with the recess 2 and the undercut 3 by using the above-described swaging device, first, as shown in FIG. 3(*a*), the material 1 is gripped by a clamper 11, and a mandrel 12 is inserted into the recess 2 of the material 1. This mandrel 12 is configured so as to have an outside diameter equal to the inside diameter of the blind hole in an aimed product (fuel injection nozzle).

As shown in FIG. 3(*b*), the material 1 is pushed in to a position at which the material 1 abuts on a stopper 13 by using the mandrel 12, and the outside surface of the material 1 is struck by the swaging dies 8 as described above to perform swaging operation. The inside diameter of the recess 2 is decreased to the outside diameter of the mandrel 12 by this swaging operation with the undercut 3 being left. The machining method for the material is not limited to plunge machining in which a tool is moved in the radial direction as shown in the figure, and infeed machining in which the material is moved in the axial direction may be performed.

Thereafter, the external shape of product (fuel injection nozzle) is formed by turning. However, the turning can be omitted by forming the tip end of the swaging die 8 into a predetermined shape.

Second Invention

Next, an example of a second invention will be explained. The second invention is an improvement on the first invention; specifically, in the first invention, the large-diameter recess is formed in the material by forging (forward extrusion or backward extrusion), and after the undercut has been formed at the inner periphery of the recess, the mandrel having a diameter equal to the diameter of the inner peripheral portion of an aimed member is inserted into the recess, and then the material is swaged from the outside. Thereafter, the nozzle shape is formed, for example, by grinding the outside surface.

The method of the first invention is very effective in forming a fuel injection nozzle etc. However, since the ordinary mandrel used for swaging has a flat tip end portion, the machining of the female tapered tip end portion of a hollow hole must be performed subsequently, so that the machining operation is troublesome. Also, even if the female tapered tip end portion is formed by post-machining, it is impossible to exactly know the length of the female tapered tip end portion. Therefore, it is impossible to exactly know a grinding allowance at the time when the final external dimensions are obtained, so that the thickness of the tip end portion is liable to vary.

Also, it is necessary to use a very thin mandrel in forming a fuel injection nozzle etc. In the case where the very thin mandrel is used, if the tip end of the mandrel shifts from the recess center as shown in FIG. 4, the material tilts when it abuts on the stopper, so that a high load is applied to the mandrel, and hence buckling may occur. Also, the tilt of material results in the impossibility of obtaining the depth accuracy of a hollow hole.

Accordingly, in the second invention, first, a rod-shaped material 21 shown in FIG. 5(*a*) is prepared by cutting a billet. As this rod-shaped material, SCM415 etc. are suitable. Subsequently, as shown in FIG. 5(*b*), a recess 22 is formed in the rod-shaped material 21 by cold forging (forward extrusion or backward extrusion). This recess 22 is a portion that forms the inner peripheral portion of product subsequently. The recess 22 is formed so as to have a diameter larger than that of the inner peripheral portion of product and have a diameter so large that the recess 22 can be machined satisfactorily (not smaller than 10 mm).

After the rod-shaped material 21 has been cold forged, as shown in FIG. 5(*c*), an undercut 23 is formed in the recess 22, and successively, as shown in FIG. 5(*d*), the recess 22 is formed into a blind hole 24 having an inside diameter of 2 to 4 mm by cold swaging. Further, the outer peripheral surface is machined by turning to obtain a product (fuel injection nozzle) shown in FIG. 5(*e*).

The machining method for the material is not limited to plunge machining in which a tool is moved in the radial direction as shown in the figure, and infeed machining in which the material is moved in the axial direction may be performed. Also, the turning can be omitted by forming the tip end portion of the swaging die into a predetermined shape in advance.

The swaging device is the same as the device used in the first invention. Specifically, as shown in FIG. 2, the swaging device has an inside rotor 5 and an outside rotor 6. In the inside rotor 5, through holes 7 extending in the radial direction are formed at 90° intervals, and a swaging die 8 and a striker 9 are slidably fitted in each of the through holes 7 in the named order from the inside. On the other hand, in the outside rotor 6, twelve pins 10 are rotatably held at equal intervals in the circumferential direction.

In the above-described swaging device, when the inside rotor 5 is turned clockwise and the outside rotor 6 is turned counterclockwise, the swaging die 8 and the striker 9 that are held in the inside rotor 5 are urged to the outside in the radial direction by a centrifugal force. Since the outside rotor 6 turns on the outside and a part of each of the pins 10 held in the outside rotor 6 projects to the inside from the outside rotor 6, the pin 10 pushes the striker 9 inward in the radial direction each time the pin 10 passes through the outer end portion of the striker 9. Accordingly, the swaging die 8 is also pushed inward in the radial direction to strike the surface of the material set in the center of the four swaging dies 8 at a rate of several thousand cycles per minute to perform swaging operation.

In order to form the material 21 formed with the recess 22 and the undercut 23 by using the above-described swaging device, first, as shown in FIG. 6(*a*), the material 21 is gripped by a clamper 11, and a mandrel 12 is inserted into the recess 22 of the material 21. This mandrel 12 is configured so that the outside diameter thereof is equal to the inside diameter of the blind hole 24 in an aimed product (fuel injection nozzle), and a tip end portion 12*a* thereof has a conical shape to form a female tapered portion 24*a* at the tip end of the blind hole 24 of an aimed product.

As shown in FIG. 6(*b*), the material 21 is pushed in to a position at which the material 21 abuts on a stopper 13 by using the mandrel 12, and the outside surface of the material 21 is struck by the swaging dies 8 as described above to perform swaging operation. The inside diameter of the recess 22 is decreased to the outside diameter of the mandrel 12 by this swaging operation with the undercut 23 being left. With decreasing diameter, a material in the bottom portion of the material 21 also moves to the inside as indicated by the arrow marks so as to wrap the tip end portion 12*a* of the mandrel, by which the female tapered portion 24*a* is formed as shown in FIG. 6(*c*).

The position of the female tapered portion 24*a* is consistent with the tip end portion 12*a* of the mandrel. Also, the length of the mandrel 12 and the position of the end portion of the material 21 can be measured by a sensor or the like. Therefore, it is possible to exactly know the thickness (t0) of the bottom portion of the material 27, so that a grinding allowance (t1) can be determined from this thickness (t0). That is to say, the tip end portion 12*a* of the mandrel can be used as a machining allowance in the lengthwise direction.

FIG. 7(*a*) is a view showing an example in which a positioning hole 25 is formed in the center of the recess 22 of the material 21. By inserting the tip end portion 12*a* of the mandrel into the positioning hole 25, the material 21 is prevented from being tilted by the shift of the mandrel 12 at the time of swaging operation.

If the opening angle of the positioning hole 25 is smaller than the angle of the tip end portion 12*a* of the mandrel as shown in FIG. 7(*b*), a deficient thickness may be produced after the swaging operation. Therefore, the positioning hole 25 is formed so that the depth thereof is equal to or shallower than the length of the mandrel tip end portion, and the opening angle thereof is equal to or larger than the angle of the mandrel tip end portion.

It is advantageous in terms of process that the positioning hole 25 be formed by forging (forward extrusion) as shown in FIG. 8 at the same time that the recess 22 is formed. Also, the recess 22 and the positioning hole 25 may be formed at the same time by backward extrusion in place of the forward extrusion.

FIGS. 9(*a*) and 9(*b*) each show examples in which in addition to the positioning hole 25, an excess thickness portion 21*a* or 21*b* is provided in the outer peripheral portion of the material 21 or in the inner peripheral portion of the recess 22 in a predetermined range from the bottom of the recess 22 at the time of forging operation. At the time of swaging operation, since the material of the material 21 moves in the opening direction along the axial direction, the material runs short near the bottom of the recess 22. However, the provision of the excess thickness portion 21*a* or 21*b* can compensate this shortage.

Third Invention

Next, an example of a third invention will be explained. The third invention is an improvement on the first invention; specifically, in the first invention, the large-diameter recess is formed in the material by forging (forward extrusion or backward extrusion) as described above, and as shown in FIG. 10(*a*), after the undercut has been formed at the inner periphery of the recess, the mandrel having a diameter equal to the diameter of the inner peripheral portion of an aimed member is inserted into the recess, and then the material is swaged from the outside. Thereafter, the nozzle shape is formed, for example, by grinding the outside surface.

The method of the first invention is very effective in forming a fuel injection nozzle etc. However, when the forming ratio is high, the material flows in the opening direction along the lengthwise direction at the time of swaging operation. At this time, the corner portion of the recess is left behind as shown in FIG. 10(*b*), and finally a deficient thickness may be produced as shown in FIG. 10(*c*).

Accordingly, in the third invention, first, a rod-shaped material 31 shown in FIG. 11(*a*) is prepared by cutting a billet. As this rod-shaped material, SCM415 etc. are suitable. Subsequently, as shown in FIG. 11(*b*), a recess 32 is formed in the rod-shaped material 31 by cold forging (forward extrusion or backward extrusion). This recess 32 is a portion that forms the inner peripheral portion of product subsequently. The recess 32 is formed so as to have a diameter larger than that of the inner peripheral portion of product and have a diameter so large that the recess 32 can be machined satisfactorily (not smaller than 10 mm).

A chamfered portion 32*a* is formed in the corner portion of the bottom of the recess 32. As shown in FIG. 12(*a*), the chamfered portion 32*a* is R-chamfered, and the formation region thereof is a region that provides a clearance between the swaging mandrel and the inner peripheral surface of the recess 32. The whole of this clearance region may be chamfered. However, if 35% or more of the clearance region is chamfered, there is no fear of producing a deficient thickness.

Also, the chamfered portion 32*a* is not limited to R-chamfer, and may be C-chamfered as shown in FIG. 12(*b*). Further, as shown in FIG. 12(*b*), a positioning hole 34 in which the conical tip end portion of the mandrel is inserted is formed in advance in the center of the recess 32, by which the material 31 is prevented from being tilted by the shift of the mandrel at the time of swaging operation.

It is advantageous in terms of forming efficiency that the recess 32, the chamfered portion 32*a*, and the positioning hole 34 be formed at the same time by cold forging (forward extrusion) shown in FIG. 13. The forging may be performed by backward extrusion. However, since the backward extrusion buckles the punch easily, forward extrusion is more advantageous.

Returning to FIG. 11, after the rod-shaped material 31 has been cold forged, as shown in FIG. 11(*c*), an undercut 33 is formed in the recess 32, and successively, as shown in FIG. 11(*d*), the recess 32 is formed into a blind hole 34 having an inside diameter of 2 to 4 mm by cold swaging. Further, the outer peripheral surface is machined by turning to obtain a product (fuel injection nozzle) shown in FIG. 11(*e*).

The swaging device is the same as the device used in the first invention. Specifically, as shown in FIG. 2, the swaging device has an inside rotor 5 and an outside rotor 6. In the inside rotor 5, through holes 7 extending in the radial direction are formed at 90° intervals, and a swaging die 8 and a striker 9 are slidably fitted in each of the through holes 7 in the named order from the inside. On the other hand, in the outside rotor 6, twelve pins 10 are rotatably held at equal intervals in the circumferential direction.

In the above-described swaging device, when the inside rotor 5 is turned clockwise and the outside rotor 6 is turned counterclockwise, the swaging die 8 and the striker 9 that are held in the inside rotor 5 are urged to the outside in the radial direction by a centrifugal force. Since the outside rotor 6 turns on the outside and a part of each of the pins 10 held in the outside rotor 6 projects to the inside from the outside rotor 6, the pin 10 pushes the striker 9 inward in the radial direction each time the pin 10 passes through the outer end portion of the striker 9. Accordingly, the swaging die 8 is also pushed inward in the radial direction to strike the surface of the material set in the center of the four swaging dies 8 at a rate of several thousand cycles per minute to perform swaging operation.

In order to form the material 31 formed with the recess 32 and the undercut 33 by using the above-described swaging device, first, as shown in FIG. 14(*a*), the material 31 is gripped by a clamper 11, and a mandrel 12 is inserted into the recess 32 of the material 31. This mandrel 12 is configured so that the outside diameter thereof is equal to the inside diameter of the blind hole 34 in an aimed product (fuel injection nozzle), and a tip end portion 12*a* thereof has a conical shape to form a female tapered portion 34*a* at the tip end of the blind hole 34 of aimed product.

As shown in FIG. 14(*b*), the material 31 is pushed in to a position at which the material 31 abuts on a stopper 13 by using the mandrel 12, and the outside surface of the material 31 is struck by the swaging dies 8 as described above to perform swaging operation. The inside diameter of the recess 32 is decreased to the outside diameter of the mandrel 12 by this swaging operation with the undercut 33 being left.

With decreasing diameter, a material in the corner portion of the bottom of the material 31 also moves to the inside as indicated by the arrow marks so as to wrap the tip end portion 12*a* of the mandrel, by which the female tapered portion 34*a* is formed as shown in FIG. 14(*c*). At this time, since the corner portion forms the chamfered portion 32*a*, a shortage of material does not occur when the material moves.

The machining method for the material is not limited to plunge machining in which a tool is moved in the radial direction as shown in the figure, and infeed machining in which the material is moved in the axial direction may be performed. Also, the turning can be omitted by forming the tip end portion of the swaging die into a predetermined shape in advance.

Fourth Invention

Next, an example of a fourth invention will be explained. The fourth invention is an improvement on the first invention; specifically, in the first invention, the large-diameter recess is formed in the material by forging (forward extrusion or backward extrusion), and after the undercut has been formed at the inner periphery of the recess, the mandrel having a diameter equal to the diameter of the inner peripheral portion of an aimed member is inserted into the recess, and then the material is swaged from the outside. Thereafter, the nozzle shape is formed, for example, by grinding the outside surface.

The method of the first invention is very effective in forming a fuel injection nozzle etc. However, when the forming ratio is high, the material flows in the opening direction along the lengthwise direction at the time of swaging operation. As a result, in some products, a deficient thickness may be produced at the inner periphery of the bottom portion of the recess as shown in FIG. 15.

Accordingly, in the fourth invention, a rod-shaped material 41 shown in FIG. 16(*a*) is prepared by cutting a billet. As this rod-shaped material, SCM415 etc. are suitable. Subsequently, as shown in FIG. 16(*b*), a recess 42 is formed in the rod-shaped material 41 by cold forging (forward extrusion or backward extrusion). This recess 42 is a portion that forms the inner peripheral portion of product subsequently. The recess 42 is formed so as to have a diameter larger than that of the inner peripheral portion of product and have a diameter so large that the recess 42 can be machined satisfactorily (not smaller than 10 mm).

In the case where forward extrusion is performed as the cold forging operation as shown in FIG. 17, an excess thickness portion 41*a* is provided at the outer periphery of the rod-shaped material 41 in a predetermined length range from the bottom of the recess 42. This excess thickness portion 41*a* compensates the flow of material at the time of swaging operation, described later. The preferred range (L) is 2d≦L≦4d, where d is mandrel diameter (nozzle inside diameter) at the time of swaging operation.

Also, in the case where backward extrusion is performed as the cold forging operation as shown in FIG. 18, an excess thickness portion 41*b* is provided at the inner periphery of the recess 42 in a predetermined length range from the bottom thereof. For this excess thickness portion 41*b* as well, the preferred range is 2d≦L≦4d.

An excess thickness is produced from a position of a clearance between the mandrel and the prepared hole from the bottom. Therefore, if the range of the excess thickness portion is narrower than two times the mandrel diameter (d), the material may run short in the portion above the production position. Also, if the range exceeds four times, the material flows into the undercut, which may deform the shape of the undercut. For this reason, the range was set at two to four times of d. Also, the volume of the excess thickness portion is determined from a preliminary test so as to be larger than the volume of a deficient thickness portion produced.

In this example, an example in which the excess thickness portion is formed simultaneously with the cold forging operation has been shown. However, the excess thickness portion may be formed apart from the formation of the recess 42.

After the rod-shaped material 41 has been cold forged as described above, as shown in FIG. 16(*c*), an undercut 43 is formed in the recess 42, and successively, as shown in FIG. 16(*d*), the recess 42 is formed into a blind hole 44 having an inside diameter of 2 to 4 mm by cold swaging. Further, the outer peripheral surface is machined by turning to obtain a product (fuel injection nozzle) shown in FIG. 15(*e*).

The swaging device is the same as the device used in the first invention. Specifically, as shown in FIG. 2, the swaging device has an inside rotor 5 and an outside rotor 6. In the inside rotor 5, through holes 7 extending in the radial direction are formed at 90° intervals, and a swaging die 8 and a striker 9 are slidably fitted in each of the through holes 7 in the named order from the inside. On the other hand, in the outside rotor 6, twelve pins 10 are rotatably held at equal intervals in the circumferential direction.

In the above-described swaging device, when the inside rotor 5 is turned clockwise and the outside rotor 6 is turned counterclockwise, the swaging die 8 and the striker 9 that are held in the inside rotor 5 are urged to the outside in the radial direction by a centrifugal force. Since the outside rotor 6 turns on the outside and a part of each of the pins 10 held in the outside rotor 6 projects to the inside from the outside rotor 6, the pin 10 pushes the striker 9 inward in the radial direction each time the pin 10 passes through the outer end portion of the striker 9. Accordingly, the swaging die 8 is also pushed inward in the radial direction to strike the surface of the material set in the center of the four swaging dies 8 at a rate of several thousand cycles per minute to perform swaging operation.

In order to form the material 41 formed with the recess 42 and the undercut 43 by using the above-described swaging device, first, as shown in FIG. 19(*a*), the material 41 is gripped by a clamper 11, and a mandrel 12 is inserted into the recess 42 of the material 41. This mandrel 12 is configured so as to have an outside diameter equal to the inside diameter of the blind hole in an aimed product (fuel injection nozzle).

As shown in FIG. 19(*b*), the material 41 is pushed in to a position at which the material 41 abuts on a stopper 13 by using the mandrel 12, and the outside surface of the material 41 is struck by the swaging dies 8 as described above to perform swaging operation. The inside diameter of the recess 42 is decreased to the outside diameter of the mandrel 12 by this swaging operation with the undercut 43 being left. At this time, since the material of the material 41 moves in the opening direction along the axial direction, the material runs short near the bottom of the recess 42. However, this shortage is compensated by the excess thickness portion 41*a* or 41*b*.

The machining method for the material is not limited to plunge machining in which a tool is moved in the radial direction as shown in the figure, and infeed machining in which the material is moved in the axial direction may be performed.

Thereafter, the external shape of product (fuel injection nozzle) is formed by turning. However, the turning can be omitted by forming the tip end of the swaging die 8 into a predetermined shape.

Fifth Invention

A fifth invention relates to a valve guide and a method of forming the valve guide. Specifically, first, a rod-shaped material 51 consisting of an Al-base composite material shown in FIG. 20(*a*) is prepared by cutting a billet. The Al-base composite material is an alloy consisting mainly of $Al_20_3$ to which SiC etc. are added. This Al-base composite material has an elongation percentage of 2 to 5%. The elongation percentage allowing a cold swaging operation, described later, is about 10%. However, the swaging operation can be performed even on a material having an elongation percentage of 2 to 5% by decreasing the feed of die.

Subsequently, as shown in FIG. 20(*b*), a recess 52 is formed in the rod-shaped material 51 by cold forging (forward extrusion or backward extrusion). This recess 52 is a portion that forms an inner peripheral portion for slidingly guiding a valve stem subsequently. The recess 52 is formed so as to have a diameter larger than that of the inner peripheral portion of valve guide and have a diameter so large that the recess 52 can be machined satisfactorily (not smaller than 10 mm).

After the recess 52 has been formed by cold forging, as shown in FIG. 20(*c*), the recess 52 is formed into a small-diameter hole 53 (the same diameter as that of the valve stem) by cold swaging.

In the above-described swaging operation, the bottom portion of the recess 52 is left because the bottom portion is gripped by a mandrel and a stopper of a swaging device. Therefore, as shown in FIG. 20(*d*), the bottom portion is cut to form a cylindrical shape. Subsequently, by machining the outer peripheral portion, a valve guide W having a flange 54 is obtained as shown in FIG. 20(*e*).

The outer peripheral portion can be formed by cutting simultaneously with the swaging operation. In this case, the cutting operation can be omitted by contriving the shape of swaging die.

For the above-described swaging operation, the swaging device used in the first invention is used. Specifically, as shown in FIG. 2, the swaging device has an inside rotor 5 and an outside rotor 6. In the inside rotor 5, through holes 7 extending in the radial direction are formed at 90° intervals, and a swaging die 8 and a striker 9 are slidably fitted in each of the through holes 7 in the named order from the inside. On the other hand, in the outside rotor 6, twelve pins 10 are rotatably held at equal intervals in the circumferential direction.

In the above-described swaging device, when the inside rotor 5 is turned clockwise and the outside rotor 6 is turned counterclockwise, the swaging die 8 and the striker 9 that are held in the inside rotor 5 are urged to the outside in the radial direction by a centrifugal force. Since the outside rotor 6 turns on the outside and a part of each of the pins 10 held in the outside rotor 6 projects to the inside from the outside rotor 6, the pin 10 pushes the striker 9 inward in the radial direction each time the pin 10 passes through the outer end portion of the striker 9. Accordingly, the swaging die 8 is also pushed inward in the radial direction to strike the surface of the material set in the center of the four swaging dies 8 at a rate of several thousand cycles per minute to perform swaging operation.

In order to form the material 51 formed with the recess 52 by using the above-described swaging device, first, as shown in FIG. 22(*a*), the material 51 is gripped by a clamper 11, and the mandrel 12 is inserted into the recess 52 of the material 51. This mandrel 12 is configured so as to have an outside diameter equal to the inside diameter of a guide hole in the valve guide, namely, the diameter of the valve stem.

As shown in FIG. 22(*b*), the material 51 is pushed in to a position at which the material 51 abuts on the stopper 13 by using the mandrel 12, and the outside surface of the material 51 is struck by the swaging dies 8 as described above to perform swaging operation. The inside diameter of the recess 52 is decreased to the outside diameter of the mandrel 12 by this swaging operation.

The conventional valve guide has no problem of lubricity because it is formed of a sintered product of oil-bearing alloy or formed of cast iron. However, in the case where the Al-base composite material is used as the material for the valve guide and is swaged as in the present invention, the lubricity may become insufficient.

An example for solving this problem is shown in FIG. 23. FIG. 23(*a*) shows a state in which the recess 52 is formed by cold forging the rod-shaped material 51 and a groove 52*a* is formed in the inner peripheral surface of the recess 52 by post-machining. After this material 51 has been swaged, the groove 52*a* does not disappear and remains as a groove 53*a* in the inner peripheral surface of the small-diameter hole 57, the groove 53*a* serving as an oil groove.

Sixth Invention

A sixth invention relates to a method of forming a tubular member such as a valve guide. Specifically, first, a rod-shaped material 61 consisting of an Al-base composite material shown in FIG. 24(*a*) is prepared by cutting a billet. The Al-base composite material is an alloy consisting mainly of $Al_2O_3$ to which SiC etc. are added. This Al-base composite material has an elongation percentage of 2 to 5%. The elongation percentage allowing a cold swaging operation, described later, is about 10%. However, the swaging operation can be performed even on a material having an elongation percentage of 2 to 5% by decreasing the feed of die.

Subsequently, as shown in FIG. 24(*b*), an inside-diameter hole 62 is formed in the rod-shaped material 61 by cold forging (forward extrusion or backward extrusion), and this material is used as an intermediate material 63. Next, as shown in FIG. 24(*c*), the inner peripheral surface of the inside-diameter hole 62 is metal plated to form a metallic deposit 64 consisting of iron (Fe) or nickel-silicon carbide (Ni—SiC). The size of the inside-diameter hole 62 is set at a size allowing metal plating, concretely, at 10 to 15 mm.

Thereafter, as shown in FIG. 24(*d*), the inside-diameter hole 62 is formed into a small-diameter hole 65 having the same diameter as that of the valve stem by cold swaging.

The material having been swaged as described above is cut to a predetermined length, and further, by machining the outer peripheral portion, a valve guide W having a flange 66 is obtained as shown in FIG. 24(*e*).

The outer peripheral portion can be formed by cutting simultaneously with the swaging operation. In this case, the cutting operation can be omitted by contriving the shape of swaging die.

For the above-described swaging operation, the swaging device used in the first invention is used. Specifically, as shown in FIG. 2, the swaging device has an inside rotor 5 and an outside rotor 6. In the inside rotor 5, through holes 7 extending in the radial direction are formed at 90° intervals, and a swaging die 8 and a striker 9 are slidably fitted in each of the through holes 7 in the named order from the inside. On the other hand, in the outside rotor 6, twelve pins 10 are rotatably held at equal intervals in the circumferential direction.

In the above-described swaging device, when the inside rotor 5 is turned clockwise and the outside rotor 6 is turned counterclockwise, the swaging die 8 and the striker 9 that are held in the inside rotor 5 are urged to the outside in the radial direction by a centrifugal force. Since the outside rotor 6 turns on the outside and a part of each of the pins 10 held in the outside rotor 6 projects to the inside from the outside rotor 6, the pin 10 pushes the striker 9 inward in the radial direction each time the pin 10 passes through the outer end portion of the striker 9. Accordingly, the swaging die 8 is also pushed inward in the radial direction to strike the surface of the material set in the center of the four swaging dies 8 at a rate of several thousand cycles per minute to perform swaging operation.

The invention claimed is:

1. A method of forming a member, including a method of providing an undercut in an inner peripheral portion of the member, comprising the steps of:

forming a recess having a diameter larger than that of the inner peripheral portion of the member in a material;

forming an undercut at an inner periphery of the recess;

inserting a mandrel having a diameter equal to a diameter of an inner peripheral portion of an aimed member into the recess of the material having been formed with the undercut;

and swaging, from an outside, the material into which the mandrel has been inserted so that an inside diameter of the recess of the material is decreased to an outside diameter of the mandrel with the undercut left.

2. The method of forming a member according to claim 1, wherein the member is a fuel injection nozzle.

3. A method of forming a member having an undercut, comprising the steps of:

forming a recess having a diameter larger than a diameter of an inner peripheral portion of the member in a material;

forming the undercut at an inner periphery of the recess;

inserting a mandrel having a diameter equal to a diameter of an inner peripheral portion of an aimed member and having a conical tip end portion into the recess of the material having been formed with the undercut;

and swaging, from an outside, the material into which the mandrel has been inserted, by which an inside diameter of the recess of the material is decreased to an outside diameter of the mandrel with the undercut left, and at the same time, a tip end portion of the inner peripheral portion of the aimed member is formed into a female taper shape following the tip end portion of the mandrel.

4. The method of forming a member having an undercut according to claim 3, wherein a positioning hole into which the mandrel tip end portion is inserted is formed in a center of the large-diameter recess, and a depth of the positioning hole is equal to or shallower than a length of the mandrel tip end portion and an opening angle thereof is equal to or larger than an angle of the mandrel tip end portion.

5. The method of forming a member having an undercut according to claim 4, wherein the positioning hole is formed by forging at the same time that the recess is formed.

6. The method of forming a member having an undercut according to claim 3, wherein the member is a fuel injection nozzle.

7. A method of forming a member having an undercut, comprising the steps of:

forming a recess having a diameter larger than a diameter of an inner peripheral portion of the member in a material;

forming the undercut at an inner periphery of the recess;

inserting a mandrel having a diameter equal to a diameter of an inner peripheral portion of an aimed member into the recess of the material having been formed with the undercut;

and swaging, from an outside, the material into which the mandrel has been inserted so that an inside diameter of the recess of the material is decreased to an outside diameter of the mandrel with the undercut left, wherein a chamfered portion is formed in a bottom portion of the recess of the material before the swaging operation, and a formation region of the chamfered portion is within an outside region that provides a clearance with a tip end of the mandrel abutted, on the bottom portion of the recess.

8. The method of forming a member having an undercut according to claim 7, wherein the formation region of the chamfered portion is 35 to 100% of a clearance between the mandrel and the inner periphery of the recess.

9. The method of forming a member having an undercut according to claim 7, wherein the member is a fuel injection nozzle.

10. A method of forming a member having an undercut, comprising the steps of:

forming a recess having a diameter larger than a diameter of an inner peripheral portion of the member in a material;

forming the undercut at an inner periphery of the recess;

inserting a mandrel having a diameter equal to a diameter of an inner peripheral portion of an aimed member into the recess of the material having been formed with the undercut;

and swaging, from an outside, the material into which the mandrel has been inserted so that an inside diameter of the recess of the material is decreased to an outside diameter of the mandrel with the undercut left, wherein an excess thickness portion is provided in a predetermined length range from a bottom of the recess at the inner or an outer periphery of the recess of the material before the swaging operation.

11. The method of forming a member having an undercut according to claim 10, wherein the excess thickness portion is formed by forging at the same time that the recess is formed.

12. The method of forming a member having an undercut according to claim 10, wherein the member is a fuel injection nozzle.

* * * * *